(12) United States Patent
Zhang et al.

(10) Patent No.: US 8,693,402 B2
(45) Date of Patent: *Apr. 8, 2014

(54) DATA TRANSMISSION METHOD AND BASE STATION

(75) Inventors: Jinfang Zhang, Shanghai (CN); Sheng Liu, Shenzhen (CN); Bojie Li, Shanghai (CN)

(73) Assignee: Huawei Technologies Co., Ltd. (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/572,406

(22) Filed: Aug. 10, 2012

(65) Prior Publication Data

US 2012/0307690 A1 Dec. 6, 2012

Related U.S. Application Data

(63) Continuation of application No. 13/483,980, filed on May 30, 2012, now Pat. No. 8,270,321, which is a continuation of application No. PCT/CN2011/074677, filed on May 25, 2011.

(51) Int. Cl.
*H04W 4/00* (2009.01)

(52) U.S. Cl.
USPC .......................................................... 370/328

(58) Field of Classification Search
None
See application file for complete search history.

(56) References Cited

U.S. PATENT DOCUMENTS

| 2005/0105534 | A1 | 5/2005 | Osterling |
| 2007/0171866 | A1 | 7/2007 | Merz et al. |
| 2009/0180407 | A1 | 7/2009 | Sabat et al. |
| 2009/0215460 | A1 | 8/2009 | Hasegawa |
| 2009/0245228 | A1 | 10/2009 | Osterling |
| 2009/0252108 | A1 | 10/2009 | Watanabe |
| 2009/0290632 | A1 | 11/2009 | Wegener |
| 2010/0075678 | A1 | 3/2010 | Akman et al. |
| 2010/0118751 | A1 | 5/2010 | Sugiyama et al. |
| 2010/0246487 | A1 | 9/2010 | Aoyama et al. |

(Continued)

FOREIGN PATENT DOCUMENTS

| CN | 101409667 A | 4/2009 |
| CN | 101499964 A | 8/2009 |

(Continued)

OTHER PUBLICATIONS

Search report issued in corresponding European patent application No. 11783002.6, dated Aug. 6, 2013, total 7 pages.

(Continued)

*Primary Examiner* — Otis L Thompson, Jr.
(74) *Attorney, Agent, or Firm* — Huawei Technologies Co., Ltd.

(57) ABSTRACT

Embodiments of the present disclosure disclose a data transmission method which includes: sending, by an REC, a first part of downlink data of a downlink period to an RE before the downlink period arrives; sending, by the REC, a second part of the downlink data of the downlink period to the RE in the downlink period, where the second part and the first part constitute all downlink data of the downlink period; receiving, by the RE, the first part and the second part of the downlink data of the downlink period; and sending, by the RE, the first part and the second part as the downlink data through an air interface in the downlink period. Accordingly, the embodiments of the present disclosure also disclose a base station which can effectively improve utilization of transmission bandwidth of a CPRI interface and utilization of spectrum resources of the air interface.

11 Claims, 16 Drawing Sheets

(56) References Cited

U.S. PATENT DOCUMENTS

| | | |
|---|---|---|
| 2010/0285754 A1 | 11/2010 | Kawanabe |
| 2010/0291955 A1 | 11/2010 | Sattele |
| 2010/0329404 A1 | 12/2010 | Xiang et al. |
| 2011/0014908 A1* | 1/2011 | Eiza et al. ............... 455/423 |
| 2011/0032910 A1 | 2/2011 | Aarflot et al. |
| 2011/0117901 A1 | 5/2011 | Li et al. |
| 2011/0143813 A1 | 6/2011 | Ohashi |
| 2011/0317550 A1 | 12/2011 | Tanigawa et al. |
| 2012/0014422 A1 | 1/2012 | Wegener |
| 2012/0113972 A1 | 5/2012 | Liu et al. |
| 2012/0150521 A1 | 6/2012 | Balkwill |
| 2012/0170498 A1 | 7/2012 | Gustavsson et al. |
| 2012/0184329 A1 | 7/2012 | Yu et al. |

FOREIGN PATENT DOCUMENTS

| | | |
|---|---|---|
| CN | 201523454 U | 7/2010 |
| CN | 102238628 A | 11/2011 |
| EP | 1912448 A2 | 4/2008 |
| EP | 2139243 A1 | 12/2009 |
| WO | 2009151893 A2 | 12/2009 |

OTHER PUBLICATIONS

International Search Report and Written Opinion of the International Searching Authority issued in corresponding PCT Patent Application No. PCT/CN2011/074677, mailed Mar. 8, 2012.

Notice of Allowance issued in commonly owned U.S. Appl. No. 13/483,980, mailed Aug. 3, 2012.

\* cited by examiner

DATA TRANSMISSION METHOD AND BASE STATION

CROSS-REFERENCE TO RELATED APPLICATIONS

This application is a continuation of U.S. patent application Ser. No. 13/483,980, filed on May 30, 2012, which is a continuation of International Application No. PCT/CN2011/074677, filed on May 25, 2011, which is hereby incorporated by reference in its entirety.

FIELD

The present disclosure relates to the communications field, and in particular, to a data transmission method and a base station.

BACKGROUND

Common Public Radio Interface (CPRI) is a standard established by several communication equipment manufacturers for an interface between an Radio Equipment Controller (REC) and an Radio Equipment, radio equipment (RE) among radio base station equipments, which may effectively make a product classification for a radio base station and independently develop REC and RE technologies. According to the definition of the CPRI standard, there is a clear division between the functions of the REC and the functions of the RE, where the REC relates to network interface transmission, radio base station control and management, and digital baseband processing, and the RE relates to analog radio frequency functions, such as filtering, modulation, frequency conversion, and power amplification.

The CPRI interface equipments REC and RE may operate in an Frequency Division Duplex (FDD) mode or a Time Division Duplex, time division duplex (TDD) mode. In a TDD system, the conventional method is to allocate one optical fiber respectively for uplink transmission and downlink transmission to complete transmission of uplink and downlink baseband digital signals between the radio equipment controller REC and the RE. Because of the TDD time division duplex transmission mode, in the downlink transmission direction from the REC to the RE, padding bits are inserted in CPRI frames when there is no downlink data transmission; similarly, in the uplink transmission direction from the RE to the REC, padding bits are inserted in CPRI frames when there is no uplink data transmission, as shown in FIG. 1.

In this conventional transmission method, because the inserted padding bits carry no baseband digital signals, the transmission bandwidth utilization of the CPRI interface is only 50%, and in future distributed base station architectures having an increasing demand for optical fibers, the transmission bandwidth utilization of the CPRI interface is very low.

SUMMARY

Embodiments of the present disclosure provide a data transmission method and a base station, which are applied in a TDD system to improve transmission bandwidth utilization of a CPRI interface in the TDD system.

An embodiment of the present disclosure provides a data transmission method which is applied in a time division duplex TDD system. The method includes:

sending, by a radio equipment controller REC, a first part of downlink data of a downlink period to a radio equipment RE before the downlink period arrives;

sending, by the REC, a second part of the downlink data of the downlink period to the RE in the downlink period, where the second part and the first part constitute all downlink data of the downlink period;

receiving, by the RE, the first part and the second part of the downlink data of the downlink period; and sending, by the RE, the first part and the second part as the downlink data through an air interface in the downlink period.

An embodiment of the present disclosure provides a base station which is applied in a time division duplex TDD system. The base station includes a radio equipment RE and a radio equipment controller REC, where the RE includes a first receiving module, a second receiving module, and a downlink data sending module, and the REC includes a first downlink data delivering module and a second downlink data delivering module; where:

the first downlink data delivering module is configured to send a first part of downlink data of a downlink period to a radio equipment RE before the downlink period arrives;

the second downlink data delivering module is configured to send a second part of the downlink data of the downlink period to the RE in the downlink period, where the second part and the first part constitute all downlink data of the downlink period;

the first receiving module is configured to receive the first part of the downlink data of the downlink period;

the second receiving module is configured to receive the second part of the downlink data of the downlink period; and the downlink data sending module is configured to send the first part and the second part as the downlink data through an air interface in the downlink period.

In the foregoing technical solutions of the embodiments of the present disclosure, the original padding bits are used for transmitting useful information, and one CPRI interface supports uplink and downlink data transmission, which may effectively improve the transmission bandwidth utilization of the CPRI interface and significantly save optical fiber overheads; and the REC delivers a part or all of the downlink data of the next downlink period in advance, so that there is no additional delay on the air interface and that the utilization of spectrum resources on the air interface is effectively improved.

BRIEF DESCRIPTION OF THE DRAWINGS

To make the technical solutions of the embodiments of the present disclosure or the prior art clearer, the accompanying drawings used in the description of the embodiments or the prior art are briefly described hereunder. Evidently, the accompanying drawings illustrate only some exemplary embodiments of the present disclosure and persons of ordinary skill in the art can obtain other drawings based on these drawings without creative efforts.

DETAILED DESCRIPTION OF THE EMBODIMENTS

The technical solutions of the embodiments of the present disclosure are hereinafter described clearly and completely with reference to the accompanying drawings in the embodiments of the present disclosure. It is evident that the described embodiments are only some exemplary embodiments of the present disclosure, rather than all embodiments of the present disclosure. All other embodiments that persons of ordinary skill in the art obtain without creative efforts based on the embodiments of the present disclosure also fall within the scope of the present disclosure.

An embodiment of the present disclosure provides a data transmission method in which a TDD time division duplex transmission mode on an air interface is simulated on a CPRI interface, and uplink transmission and downlink transmission share one optical fiber based on time division multiplexing, so as to improve utilization of transmission bandwidth on the CPRI interface.

Figure 1:
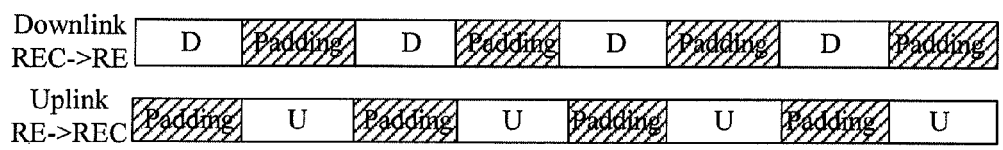
FIG. 1 is a schematic sequence chart of uplink and downlink data transmission on a CPRI interface in the prior art when equipments on the CPRI interface operate in a TDD mode.
Figure 2:
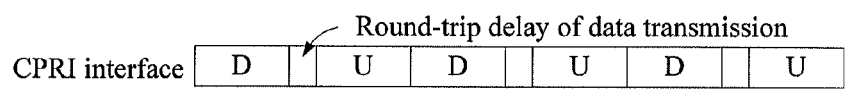
FIG. 2 is a schematic sequence chart of simulating a TDD transmission mode on a CPRI interface according to an embodiment of the present disclosure.

FIG. 2 is a schematic sequence chart of simulating a TDD transmission mode on a CPRI interface according to an embodiment of the present disclosure. As shown in FIG. 2, D represents downlink data transmitted in the downlink transmission direction from an REC to an RE, and U represents uplink data transmitted in the uplink transmission direction from the RE to the REC.

Because there is a delay when light is transmitted on an optical fiber, an interval of a round-trip delay of data transmission is needed between the time when the sending of the downlink data is completed and the time when the uplink data is received correctly, that is, there is a round-trip delay of data transmission between the uplink transmission and the downlink transmission of data on the CPRI interface. Because of the round-trip delay of data transmission on the CPRI interface, when the TDD transmission mode is simulated on the CPRI interface, a problem of idle timeslots on the air interface may arise.

Figure 3:
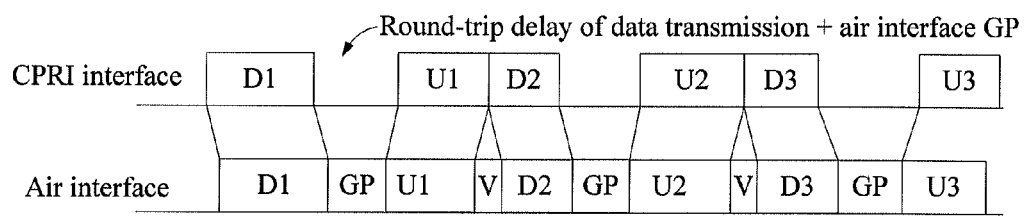
FIG. 3 is a schematic sequence chart of data transmission between a CPRI interface and an air interface according to an embodiment of the present disclosure.

FIG. 3 is a schematic sequence chart of data transmission between a CPRI interface and an air interface according to an embodiment of the present disclosure. As shown in FIG. 3, when the air interface switches from uplink to downlink, because of a round-trip delay of data transmission existing on the CPRI interface, downlink data does not arrive in time in the downlink period of the air interface, and therefore there is no data transmission on the air interface in a timeslot, such as the timeslot marked as V in FIG. 3, thereby decreasing utilization of radio spectrum resources.

Figure 4:
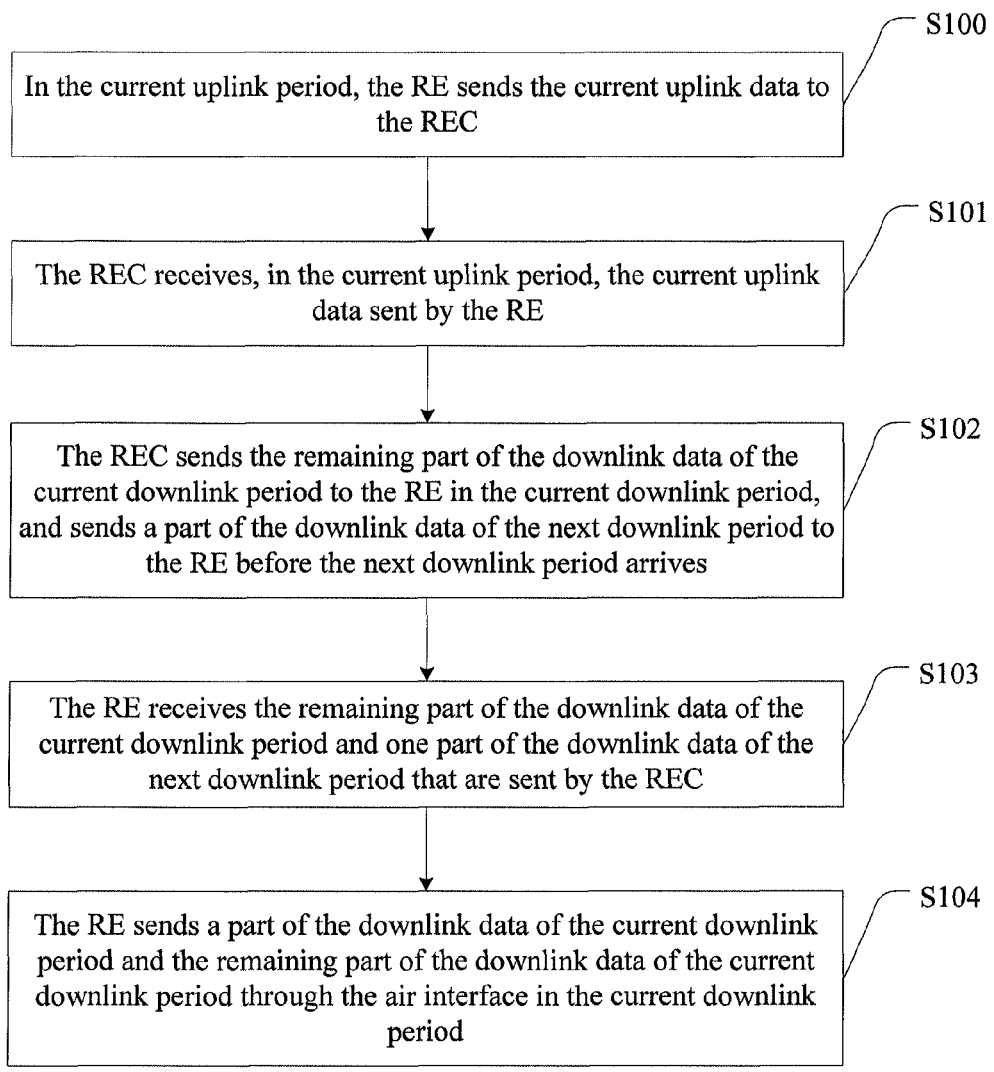
FIG. 4 is a flowchart of a data transmission method according to an embodiment of the present disclosure.

To solve the problem that the utilization of radio spectrum resources may be decreased when the TDD transmission mode is simulated on the CPRI interface, an embodiment of the present disclosure provides a data transmission method which may be applied in a TDD system. In this method, an REC and an RE simultaneously transmit uplink and downlink data through one CPRI interface, and the TDD transmission mode is simulated on the CPRI interface, therefore improving the utilization of radio spectrum resources. As shown in FIG. 4, this method includes the following steps:

S100. In the current uplink period, the RE sends the current uplink data to the REC.

S101. The REC receives, in the current uplink period, the current uplink data sent by the RE.

S102. The REC sends the remaining part of the downlink data of the current downlink period to the RE in the current downlink period, and sends a part of the downlink data of the next downlink period to the RE before the next downlink period arrives.

In an embodiment, the transmission time of the part of the downlink data of the next downlink period on the air interface is longer than or equal to the round-trip delay of data transmission on the CPRI interface between the REC and the RE and is shorter than or equal to the transmission time of all downlink data of the next downlink period on the air interface.

In an embodiment, the CPRI interface may use an optical fiber for transmission; in an embodiment, the CPRI interface may also use a cable for transmission; and in an embodiment, the CPRI interface may also use another high-speed connection line for transmission. The embodiments of the present disclosure impose no special limitation.

If the locations of the REC and the RE are fixed, the length of the optical fiber (which, certainly, may also be another high-speed connection line such as a cable) connecting the REC and the RE is also fixed, so that the transmission delay of the light in the fixed-length optical fiber (that is, the round-trip delay of data transmission on the CPRI interface) is also fixed.

S103. The RE receives the remaining part of the downlink data of the current downlink period and a part of the downlink data of the next downlink period that are sent by the REC.

In an embodiment, the part of the downlink data of the next downlink period is sent by the RE through the air interface in the next downlink period.

S104. The RE sends a part of the downlink data of the current downlink period and the remaining part of the downlink data of the current downlink period through the air interface in the current downlink period, where, the part of the downlink data of the current downlink period is sent by the REC to the RE before the current downlink period arrives.

In the foregoing technical solutions of the embodiments of the present disclosure, the original padding bits are used for transmitting useful information, and one CPRI interface supports uplink and downlink data transmission, which may effectively improve the transmission bandwidth utilization of the CPRI interface and significantly save optical fiber overheads; and the REC delivers a part or all of the downlink data of the next downlink period in advance, so that there is no additional delay on the air interface and that the utilization of spectrum resources on the air interface is effectively improved.

Figure 5:
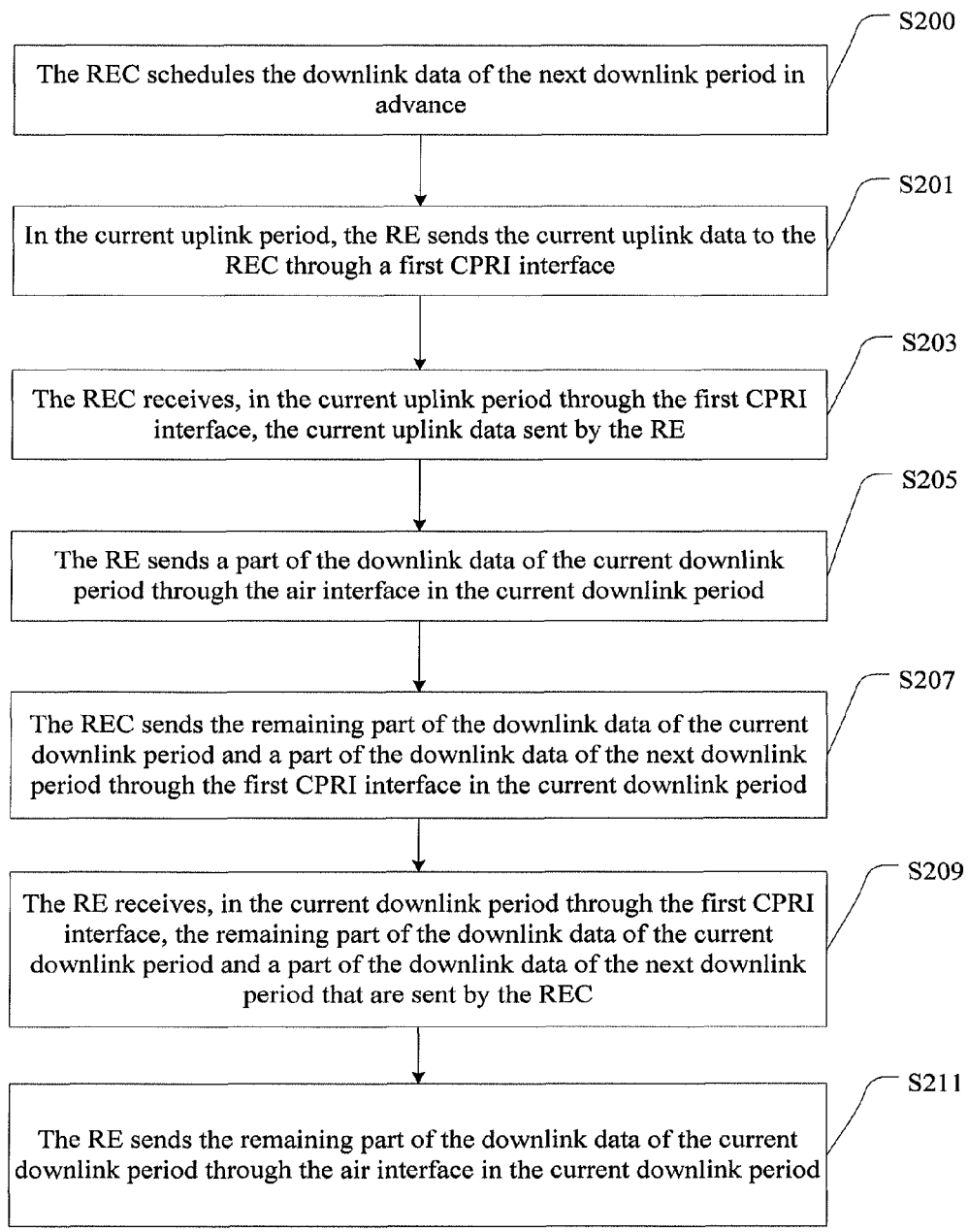
FIG. 5 is a flowchart of a data transmission method according to an embodiment of the present disclosure.

As shown in FIG. 5, an embodiment of the present disclosure provides a data transmission method which may be applied in a TDD system. In this method, an REC and an RE simultaneously transmit uplink and downlink data through one CPRI interface. This method includes the following steps:

S201. In the current uplink period, the RE sends the current uplink data to the REC through a first CPRI interface.

In this embodiment, data is transmitted between the RE and the REC through one CPRI interface (the first CPRI interface).

S203. The REC receives, in the current uplink period through the first CPRI interface, the current uplink data sent by the RE.

S205. The RE sends a part of the downlink data of the current downlink period through the air interface in the current downlink period, where the part of the downlink data of the current downlink period is sent by the REC to the RE in advance through the first CPRI interface in the previous downlink period.

S207. The REC sends the remaining part of the downlink data of the current downlink period and a part of the downlink data of the next downlink period through the first CPRI interface in the current downlink period;

In an embodiment, the transmission time of the part of the downlink data of the next downlink period on the air interface is longer than or equal to the round-trip delay of data transmission on the first CPRI interface and is shorter than or equal to the transmission time of all downlink data of the next downlink period on the air interface.

In an embodiment, because the REC simultaneously transmits two types of downlink data (the remaining part of the downlink data of the current downlink period and a part of the downlink data of the next downlink period) through the first CPRI interface, the REC also transmits demarcation point information of the two types of downlink data, so that the RE distinguishes the two types of downlink data.

Referring to FIG. 3, the length of the data delivered in advance is longer than or equal to the time occupied by V in FIG. 3, namely, the length of the data delivered in advance is longer than or equal to the length of the data that is transmitted during the time occupied by V. that is, the data round-trip delay on the first CPRI interface, which enables the downlink data sent from the REC and transmitted through the CPRI interface to arrive at the RE in time to be sent through the air interface.

If the length of the delivered data does not meet the length described above, the time for sending a part of the downlink data delivered in advance on the air interface only occupies a part of the time period V, and the remaining part of the downlink data has not arrived at the RE at this time, so that the V in the following drawing (for example FIG. 3) still exists, that is, the air interface is idle and no data is sent for some time, therefore causing waste of air interface resources.

If the length of the delivered data meets the foregoing requirement, there is downlink data that is sent within the time period V in an air interface frame, and therefore, the air interface is not idle, so that the resources of the air interface can be utilized more effectively.

S209. The RE receives, in the current downlink period through the first CPRI interface, the remaining part of the downlink data of the current downlink period and a part of the downlink data of the next downlink period that are sent by the REC.

In an embodiment, the part of the downlink data of the next downlink period is sent by the RE through the air interface in the next downlink period.

S211. The RE sends the remaining part of the downlink data of the current downlink period through the air interface in the current downlink period.

It should be noted that the sequence numbers of the foregoing steps are used to illustratively indicate the sequence number of each executed step and should not be understood as a limitation on the sequence of execution. For example, in an embodiment, S201 and S203 may be executed simultaneously; and in an embodiment, S209 and S211 may also be executed simultaneously.

As shown by the dashed-line box in FIG. 5, in an embodiment, the method also includes the following step:

S200. The REC schedules the downlink data of the next downlink period in advance, where the transmission time of the downlink data of the next downlink period on the air interface that is scheduled in advance is longer than or equal to the transmission time of a part of the downlink data of the next downlink period on the air interface, and is shorter than or equal to the transmission time of all downlink data of the next downlink period on the air interface.

Alternatively, in an embodiment, a part of the downlink data of the next downlink period may be scheduled in advance, and after that, all or a part of the part of data scheduled in advance is delivered in advance as a part of the downlink data of the next downlink period.

With an operation of scheduling in advance as an illustrative example, if an 80-unit length of downlink data of the next downlink period is scheduled in step S201 (assuming that all downlink data of the next downlink period has a length of 100 units), and at this time, a 60-unit length of downlink data in the 100-unit length are delivered in advance in step S207, a length of (100−80)+(80−60)=40 units of data remain, and the 40-unit length of data is sent by the REC to the RE in the next downlink period as the remaining part of the next downlink period (that is, from the perspective of the next downlink period, the 40-unit length of the remaining data is sent to the RE in step S207 of the next downlink period).

In this embodiment, the data is transmitted between the REC and the RE through one CPRI interface.

It should be noted that in this embodiment, S200 may be executed before S201; in another embodiment, S200 may also be executed after S201 and before S203; and in still another embodiment, S200 may also be executed after S203 and before S205. The embodiments of the present disclosure impose no special limitation.

In other words, the REC may perform the scheduling in advance in the current downlink period or in one or more previous downlink periods.

In the foregoing technical solutions of the embodiments of the present disclosure, the original padding bits are used for transmitting useful information, and one CPRI interface supports uplink and downlink data transmission, which may effectively improve the transmission bandwidth utilization of the CPRI interface and significantly save optical fiber overheads; and the REC delivers a part or all of the downlink data of the next downlink period in advance, so that there is no additional delay on the air interface and that the utilization of spectrum resources on the air interface is effectively improved.

Figure 6:
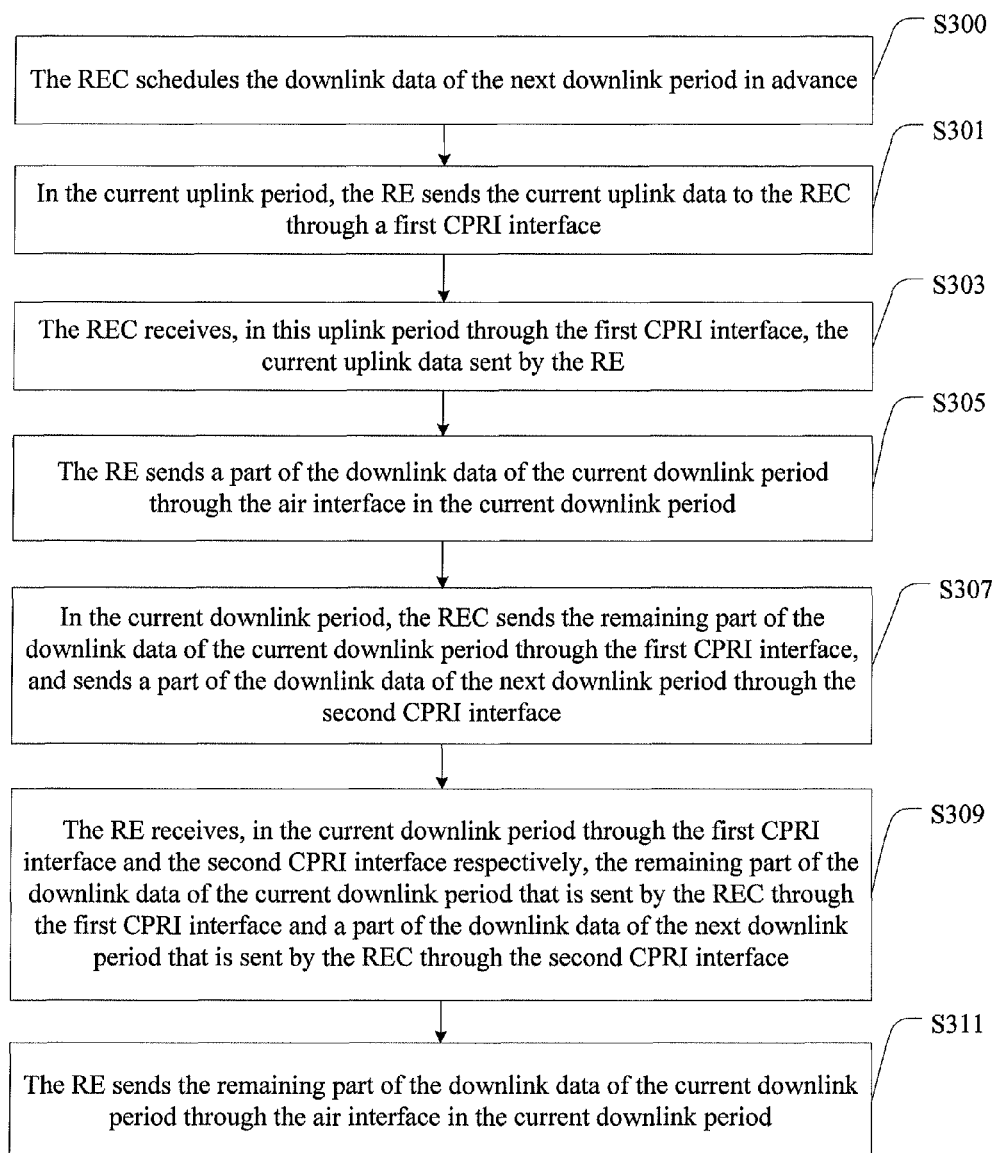
FIG. 6 is a flowchart of a data transmission method according to an embodiment of the present disclosure.

As shown in FIG. 6, an embodiment of the present disclosure provides a data transmission method which may be applied in a TDD system. In this method, an REC and an RE simultaneously transmit the downlink and uplink data of the current downlink period through one CPRI interface. This embodiment is different from the embodiment corresponding to FIG. 5 in that, in this embodiment, the REC delivers a part of the downlink data of the next downlink period to the RE in advance through another independent CPRI interface. This method includes the following steps:

S301. In the current uplink period, the RE sends the current uplink data to the REC through a first CPRI interface.

S303. The REC receives, in the uplink period through the first CPRI interface, the current uplink data sent by the RE.

S305. The RE sends a part of the downlink data of the current downlink period through an air interface, where the part of the downlink data of the current downlink period is sent by the REC to the RE in advance through a second CPRI interface in the previous downlink period.

S307. In the current downlink period, the REC sends the remaining part of the downlink data of the current downlink period through the first CPRI interface, and sends a part of the downlink data of the next downlink period through the second CPRI interface.

In an embodiment, the transmission time of the part of the downlink data of the next downlink period on the air interface is longer than or equal to the round-trip delay of data transmission on the first CPRI interface and is shorter than or equal to the transmission time of all downlink data of the next downlink period on the air interface.

It should be noted that, in this embodiment of the present disclosure, when the REC delivers a part of the downlink data of the next downlink period to the RE in advance through another independent CPRI interface, regardless of the first CPRI interface or the second CPRI interface, if the locations of the REC and the RE are fixed, the length of an optical fiber (which, certainly, may also be another high-speed connection line such as a cable) connecting the REC and the RE is fixed, so that the transmission delay of the light in the fixed-length optical fiber is also the same. That is, the round-trip delay of data transmission on the first CPRI interface and the round-trip delay of data transmission on the second CPRI interface are the same.

The exception is that in special deployment in which the two CPRI interfaces use different transmission modes, for example, one CPRI interface uses an optical fiber transmission mode, and another CPRI interface uses a cable transmission mode, because the transmission rates of light and electricity are different, the round-trip delays of transmission on the two CPRI interfaces are slightly different, but generally are in the same order of magnitude.

The use of different transmission modes between the REC and the RE will not occur in actual deployment, especially on CPRI interfaces. Because the transmission bandwidth on a CPRI interface is in the order of magnitude of several Gbps, and if a cable needs transmission bandwidth of several Gbps for transmission, the transmission distance of the cable does not exceed 100 meters. It may also be considered that an optical fiber is deployed for any transmission distance of more than 100 meters; in case that two different transmission modes are used within the range of 100 meters, because the transmission distance is very short, the round-trip delays of transmission are basically the same, and in the case of transmission in the order of magnitude of several Gbps, it is generally considered in the art that the round-trip delays of data transmission on the two CPRI interfaces are the same in the case.

Because it may be considered that the round-trip delay of data transmission on the first CPRI interface and the round-trip delay of data transmission on the second CPRI interface are the same, in an embodiment, the transmission time of a part of the downlink data of the next downlink period on the air interface may also be longer than or equal to the round-trip delay of data transmission on the second CPRI interface, and shorter than or equal to the transmission time of all downlink data of the next downlink period on the air interface. In the following embodiments, there may also be similar provisions.

S309. The RE receives, in the current downlink period through the first CPRI interface and the second CPRI interface, the remaining part of the downlink data of the current downlink period that is sent by the REC through the first CPRI interface and a part of the downlink data of the next downlink period that is sent by the REC through the second CPRI interface, respectively.

In an embodiment, the part of the downlink data of the next downlink period is sent by the RE through the air interface in the next downlink period.

Alternatively, in another embodiment, in S307, the REC may also send the remaining part of the downlink data of the current downlink period through the first CPRI interface in the current downlink period, and send a part of the downlink data of the next downlink period through the second CPRI interface in the current downlink period or uplink period.

In this way, in step S309, when the REC sends a part of the downlink data of the next downlink period through the second CPRI interface in the current uplink period in S307, the RE receives, in the current uplink period through the second CPRI interface, the part of the downlink data of the next downlink period that is sent by the REC through the second CPRI interface.

S311. The RE sends the remaining part of the downlink data of the current downlink period through the air interface in the current downlink period.

As shown by the dashed-line box in FIG. 6, in an embodiment, the method also includes the following step:

S300. The REC schedules the downlink data of the next downlink period in advance, where the transmission time of the downlink data of the next downlink period on the air interface that is scheduled in advance is longer than or equal to the transmission time of a part of the downlink data of the next downlink period on the air interface, and is shorter than or equal to the transmission time of all downlink data of the next downlink period on the air interface.

Alternatively, in an embodiment, a part of the downlink data of the next downlink period may be scheduled in advance, and after that, all or a part of the part of data scheduled in advance is delivered in advance as a part of the downlink data of the next downlink period.

In the foregoing technical solutions of the embodiments of the present disclosure, the original padding bits are used for transmitting useful information, and one CPRI interface supports uplink and downlink data transmission, which may effectively improve the transmission bandwidth utilization of the CPRI interface and significantly save optical fiber overheads; and the REC delivers a part or all of the downlink data of the next downlink period in advance, so that there is no additional delay on the air interface and that the utilization of spectrum resources on the air interface is effectively improved.

Figure 7:
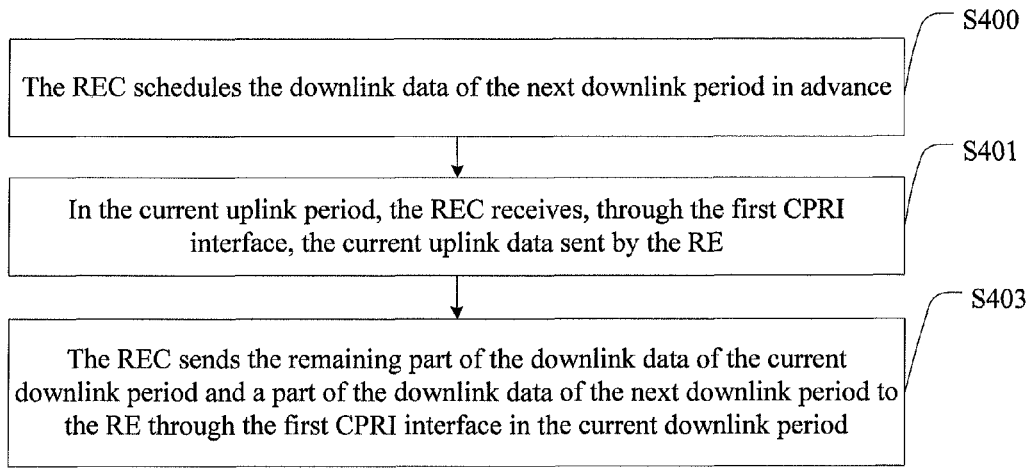
FIG. 7 is a flowchart of a data transmission method according to an embodiment of the present disclosure.

As shown in FIG. 7, an embodiment of the present disclosure provides a data transmission method which may be applied in a TDD system. In this method, an REC and an RE simultaneously transmit uplink and downlink data through one CPRI interface. This method includes the following steps:

S401. In the current uplink period, the REC receives, through a first CPRI interface, the current uplink data sent by the RE.

In an embodiment, in the current downlink period, the RE sends the current uplink data to the REC through the first CPRI interface in the uplink period.

S403. The REC sends the remaining part of the downlink data of the current downlink period and a part of the downlink data of the next downlink period to the RE through the first CPRI interface in the current downlink period.

In an embodiment, the RE receives, in the current downlink period through the first CPRI interface, the remaining part of the downlink data of the current downlink period and a part of the downlink data of the next downlink period that are sent by the REC, and meanwhile, sends the remaining part of the downlink data of the current downlink period through an air interface, and sends, in the next downlink period, a part of the downlink data of the next downlink period.

In an embodiment, the RE receives the remaining part of the downlink data of the current downlink period, and meanwhile, sends, at a corresponding time point on the air interface, the received remaining part of the downlink data of the current downlink period. For example, if the remaining data starts from the third subframe, the RE starts the sending on the air interface at a time point corresponding to the third subframe, and meanwhile, the RE may still receive data of subsequent subframes. This is a process in tandem, in which the downlink data from the REC is received while being sent on the air interface.

In an embodiment, because the REC simultaneously transmits two types of downlink data (the remaining part of the downlink data of the current downlink period and a part of the downlink data of the next downlink period) through the first CPRI interface, the REC also transmits demarcation point information of the two types of downlink data, so that the RE distinguishes the two types of downlink data.

In an embodiment, the transmission time of the part of the downlink data of the next downlink period on the air interface is longer than or equal to the round-trip delay of data transmission on the first CPRI interface and is shorter than or equal to the transmission time of all downlink data of the next downlink period on the air interface.

As shown by the dashed-line box in FIG. 7, in an embodiment, the method also includes the following step:

S400. The REC schedules the downlink data of the next downlink period in advance, where the transmission time of the downlink data of the next downlink period on the air interface that is scheduled in advance is longer than or equal to the transmission time of a part of the downlink data of the next downlink period on the air interface, and is shorter than or equal to the transmission time of all downlink data of the next downlink period on the air interface.

In the foregoing technical solutions of the embodiments of the present disclosure, the original padding bits are used for transmitting useful information, and one CPRI interface supports uplink and downlink data transmission, which may effectively improve the transmission bandwidth utilization of the CPRI interface and significantly save optical fiber overheads; and the REC delivers a part or all of the downlink data of the next downlink period in advance, so that there is no additional delay on the air interface and that the utilization of spectrum resources on the air interface is effectively improved.

Figure 8:
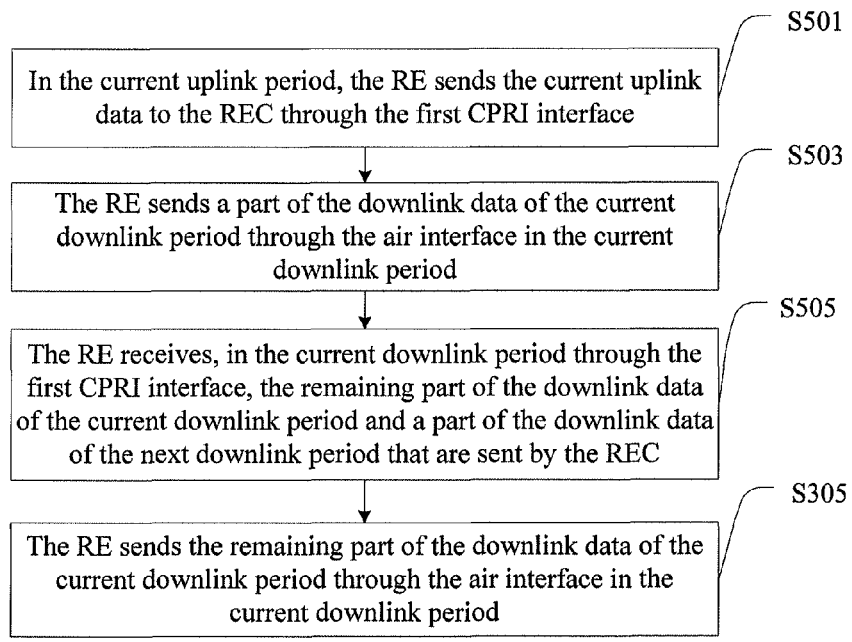
FIG. 8 is a flowchart of a data transmission method according to an embodiment of the present disclosure.

As shown in FIG. 8, an embodiment of the present disclosure provides a data transmission method which may be applied in a TDD system. In this method, an REC and an RE simultaneously transmit uplink and downlink data through one CPRI interface. This method includes the following steps:

S501. In the current uplink period, the RE sends the current uplink data to the REC through a first CPRI interface.

s503. The RE sends a part of the downlink data of the current downlink period through an air interface in the current downlink period, where the part of the downlink data of the current downlink period is sent by the REC to the RE in advance through the first CPRI interface in the previous downlink period.

S505. The RE receives, in the current downlink period through the first CPRI interface, the remaining part of the downlink data of the current downlink period and a part of the downlink data of the next downlink period that are sent by the REC.

In an embodiment, the part of the downlink data of the next downlink period is sent by the RE through the air interface in the next downlink period.

In an embodiment, the transmission time of the part of the downlink data of the next downlink period on the air interface is longer than or equal to the round-trip delay of data transmission on the first CPRI interface and is shorter than or equal to the transmission time of all downlink data of the next downlink period on the air interface.

S507. The RE sends the remaining part of the downlink data of the current downlink period through the air interface in the current downlink period.

In the foregoing technical solutions of the embodiments of the present disclosure, the original padding bits are used for transmitting useful information, and one CPRI interface supports uplink and downlink data transmission, which may effectively improve the transmission bandwidth utilization of the CPRI interface and significantly save optical fiber overheads; and the REC delivers a part or all of the downlink data of the next downlink period in advance, so that there is no additional delay on the air interface and that the utilization of spectrum resources on the air interface is effectively improved.

Figure 9:
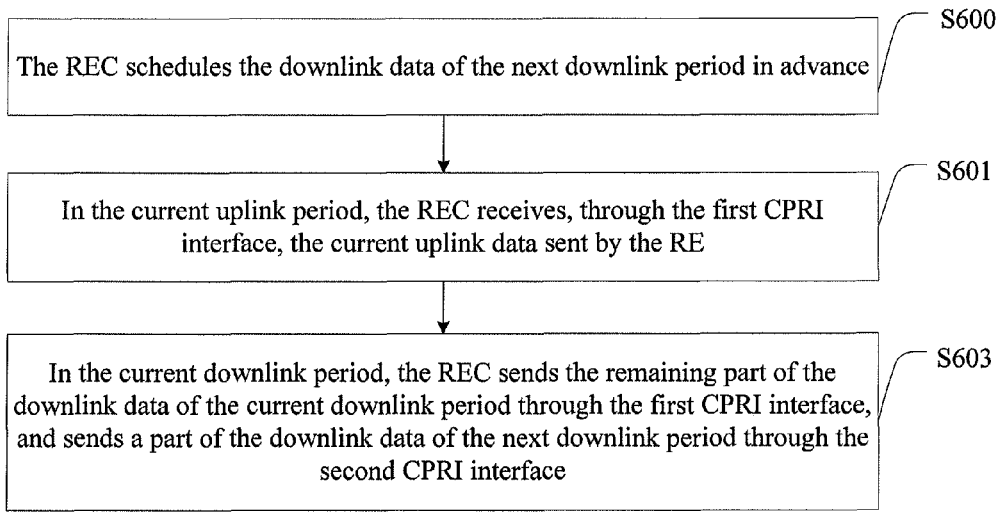
FIG. 9 is a flowchart of a data transmission method according to an embodiment of the present disclosure.

As shown in FIG. 9, an embodiment of the present disclosure provides a data transmission method which may be applied in a TDD system. In this method, an REC and an RE transmit data through two CPRI interfaces: The REC and the RE simultaneously transmit the remaining part of the downlink data of the current downlink period and the uplink data of the current uplink period through one CPRI interface, and the REC delivers a part of the downlink data of the next downlink period in advance through another independent CPRI interface. This method includes the following steps:

S601. In the current uplink period, the REC receives, through a first CPRI interface, the current uplink data sent by the RE.

In an embodiment, in the current downlink period, the RE sends the current uplink data to the REC through the first CPRI interface in the uplink period.

S603. In the current downlink period, the REC sends the remaining part of the downlink data of the current downlink period through the first CPRI interface, and sends a part of the downlink data of the next downlink period through a second CPRI interface.

In an embodiment, the part of the downlink data of the next downlink period is sent by the RE through the air interface in the next downlink period.

In an embodiment, the transmission time of the part of the downlink data of the next downlink period on the air interface is longer than or equal to the round-trip delay of data transmission on the first CPRI interface and is shorter than or equal to the transmission time of all downlink data of the next downlink period on the air interface.

In an embodiment, in the current downlink period, the RE receives, through the first CPRI interface, the remaining part of the downlink data of the current downlink period that is sent by the REC, and receives, through the second CPRI interface, a part of the downlink data of the next downlink period, and meanwhile, sends the remaining part of the downlink data of the current downlink period through the air interface.

Alternatively, in another embodiment, in S603, the REC may also send the remaining part of the downlink data of the current downlink period through the first CPRI interface in the current downlink period, and send a part of the downlink data of the next downlink period through the second CPRI interface in the current downlink period or uplink period.

In this way, when the REC sends a part of the downlink data of the next downlink period through the second CPRI interface in the current uplink period, the RE receives, in the current uplink period through the second CPRI interface, a part of the downlink data of the next downlink period that is sent by the REC through the second CPRI interface.

As shown by the dashed-line box in FIG. 9, in an embodiment, the method also includes the following step:

S600. The REC schedules the downlink data of the next downlink period in advance, where the transmission time of the downlink data of the next downlink period on the air interface that is scheduled in advance is longer than or equal to the transmission time of a part of the downlink data of the next downlink period on the air interface, and is shorter than or equal to the transmission time of all downlink data of the next downlink period on the air interface.

In the foregoing technical solutions of the embodiments of the present disclosure, the original padding bits are used for transmitting useful information, and one CPRI interface supports uplink and downlink data transmission, which may effectively improve the transmission bandwidth utilization of the CPRI interface and significantly save optical fiber overheads; and the REC delivers a part or all of the downlink data of the next downlink period in advance, so that there is no additional delay on the air interface and that the utilization of spectrum resources on the air interface is effectively improved.

Figure 10:
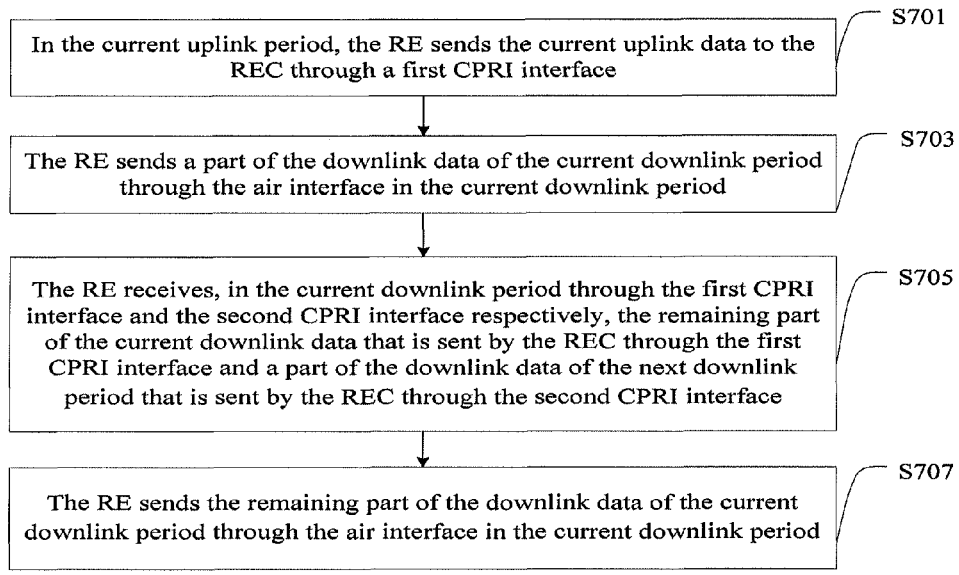
FIG. 10 is a flowchart of a data transmission method according to an embodiment of the present disclosure.

As shown in FIG. 10, an embodiment of the present disclosure provides a data transmission method which may be applied in a TDD system. In this method, an REC and an RE simultaneously transmit the remaining part of the downlink data of the current downlink period and the uplink data of the current uplink period through one CPRI interface, and the REC delivers a part of the downlink data of the next downlink period in advance through another independent CPRI interface. This method includes the following steps:

S701. In the current uplink period, the RE sends the current uplink data to the REC through a first CPRI interface.

S703. The RE sends a part of the downlink data of the current downlink period through an air interface in the current downlink period, where the part of the downlink data of the current downlink period is sent by the REC to the RE in advance through a second CPRI interface in the previous downlink period.

S705. The RE receives, in the current downlink period through the first CPRI interface and the second CPRI interface respectively, the remaining part of the downlink data of the current downlink period that is sent by the REC through the first CPRI interface and a part of the downlink data of the next downlink period that is sent by the REC through the second CPRI interface.

In an embodiment, the part of the downlink data of the next downlink period is sent by the RE through the air interface in the next downlink period.

Certainly, it is easy to understand that if the REC sends a part of the downlink data of the next downlink period through the second CPRI interface in the current uplink period, then in step S705, the RE receives, in the current uplink period through the second CPRI interface, the part of the downlink data of the next downlink period that is sent by the REC through the second CPRI interface.

S707. The RE sends the remaining part of the downlink data of the current downlink period through the air interface in the current downlink period.

In the foregoing technical solutions of the embodiments of the present disclosure, the original padding bits are used for transmitting useful information, and one CPRI interface supports uplink and downlink data transmission, which may effectively improve the transmission bandwidth utilization of the CPRI interface and significantly save optical fiber overheads; and the REC delivers a part or all of the downlink data of the next downlink period in advance, so that there is no additional delay on the air interface and that the utilization of spectrum resources on the air interface is effectively improved.

Figure 11:
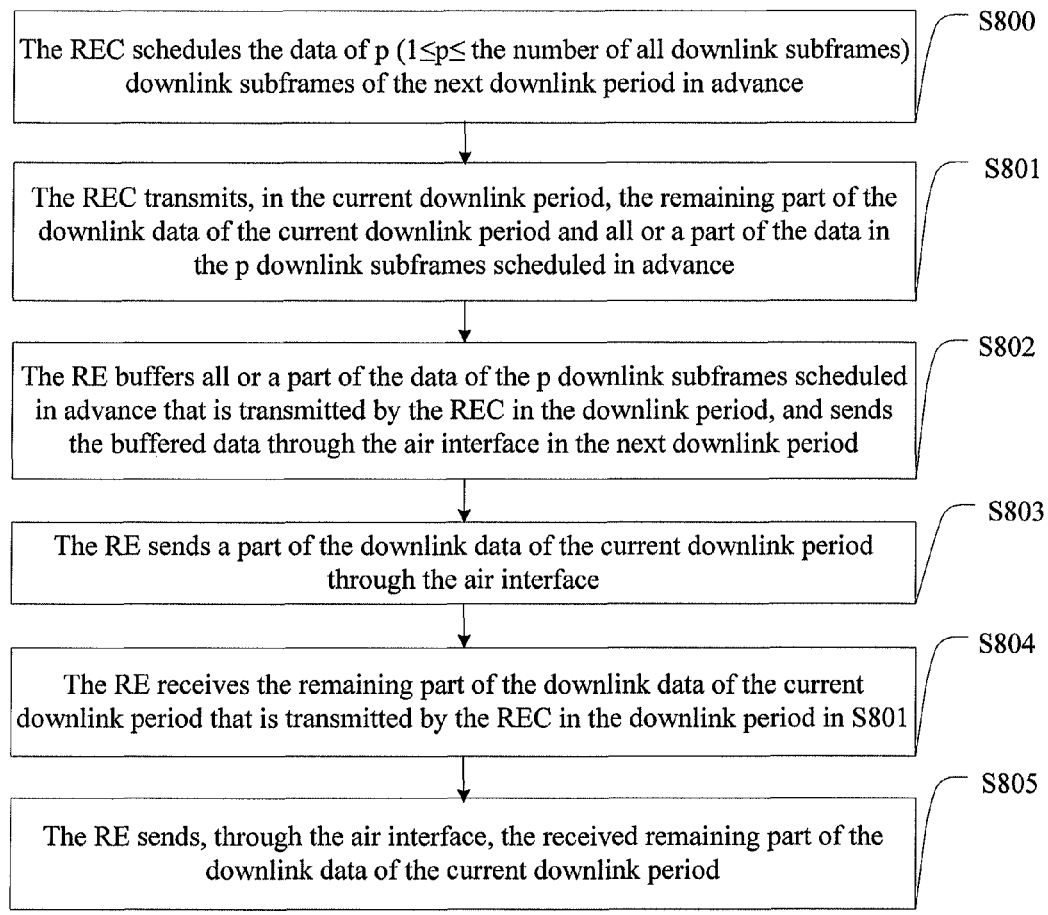
FIG. 11 is a flowchart of a data transmission method according to an embodiment of the present disclosure.

As shown in FIG. 11, an embodiment of the present disclosure provides a data transmission method which may be applied in a TDD system. In this method, an REC and an RE simultaneously transmit uplink and downlink data through one CPRI interface. This method includes the following steps:

S800. The REC schedules the data of p ($1 \leq p \leq$ the number of all downlink subframes) downlink subframes of the next downlink period in advance.

It should be noted that the process of scheduling data in advance by the REC may be performed in the current downlink period or in one or more previous uplink periods or downlink periods. The embodiment of the present disclosure imposes no special limitation.

S801. The REC transmits, in the current downlink period, the remaining part of the downlink data of the current downlink period and all or a part of the data in the p downlink subframes scheduled in advance.

In an embodiment, the REC may transmit, in the current downlink period, all data in the p downlink subframes scheduled in advance.

In an embodiment, the REC may also transmit, in the current downlink period, a part of data in the p subframes scheduled in advance; in an embodiment, the part of data may be data of m ($1 \leq m \leq p$) downlink subframes; or in an embodiment, for example, in a TD-LTE (Time Division-Long Term Evolution, time division-long term evolution) system, the part of data may also be downlink data of k OFDM symbols (it should be noted that the transmission time of one subframe on the air interface is equal to the time of 14 OFDM symbols, so $k \leq 14p$).

For example, in an embodiment, the downlink data to be scheduled in advance and the downlink data to be delivered in advance may be determined according to the round-trip delay of data transmission on the CPRI interface. The downlink data to be scheduled in advance may be data of an integral number of downlink subframes, where the transmission time of the data of the integral number of downlink subframes on the air interface is longer than or equal to the round-trip delay of data transmission on the CPRI interface; in an embodiment, the downlink data to be delivered in advance may be downlink data of an integral number of OFDM symbols, where the transmission time of the integral number of OFDM symbols on the air interface is longer than or equal to the round-trip delay of data transmission on the CPRI interface. It is easy to understand that the transmission time, on the air interface, of the data delivered in advance is shorter than or equal to the transmission time, on the air interface, of the data scheduled in advance.

S802. The RE buffers all or a part of the data of the p downlink subframes scheduled in advance that is transmitted by the REC in the current downlink period, and sends the buffered data through the air interface in the next downlink period.

S803. The RE sends a part of the downlink data of the current downlink period through the air interface in the current downlink period, where the part of the downlink data of the current downlink period is sent by the REC to the RE in advance in the previous downlink period.

S804. The RE receives, in the current downlink period, the remaining part of the downlink data of the current downlink period that is transmitted by the REC in the downlink period in S801.

S805. The RE sends, in the current downlink period through the air interface, the received remaining part of the downlink data of the current downlink period.

Figure 12:
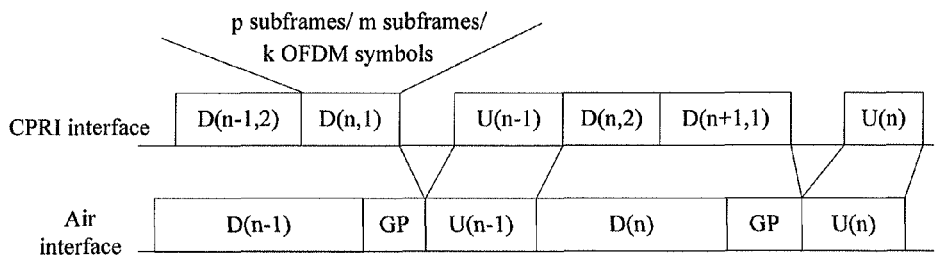
FIG. 12 is a schematic sequence chart of data transmission between a CPRI interface and an air interface according to an embodiment of the present disclosure.

FIG. 12 is a schematic sequence chart of data transmission between a CPRI interface and an air interface according to an embodiment of the present disclosure. Assuming that the current downlink period is the $n^{th}$ downlink period, as shown in FIG. 12, after an REC receives, through the CPRI interface, the uplink data U(n−1) sent by an RE, the REC delivers the remaining part of data D(n, 2) of the current downlink period and the downlink data D(n+1, 1) of the next downlink period (namely, the $(n+1)^{th}$ downlink period) that is to be delivered in advance in the current downlink period (that is, D(n+1, 1) is the part of the downlink data of the next downlink period as mentioned in the foregoing embodiments).

After the RE receives the data D(n, 2) and D(n+1, 1) delivered by the REC, D(n+1, 1) is buffered in the RE so that it is sent through the air interface at a specified time in the next downlink period and D(n, 2) is sent through the air interface at a specified time in the current downlink period.

For example, if the distance between the REC and the RE is 10 km, and an optical fiber is used for transmission, because the transmission rate of light in the optical fiber is $2 \times 10^8$ m/s, without regard to the reception/transmission switching delay and the processing delay of devices, the waiting time for sending after the air interface switches from uplink to downlink is 100 us (that is, there is a round-trip delay of data transmission of 100 us between the uplink data transmission and the downlink data transmission on the CPRI interface).

Considering that one OFDM symbol is 71.4 us, downlink data of 2 OFDM symbols needs to be sent in advance for the downlink transmission (the time of 2 OFDM symbols is 142.8 us, which is longer than the round-trip delay of data transmission on the CPRI interface, namely, 100 us). Considering that a scheduling period is 1 ms, measured in units of subframes, downlink data of one subframe needs to be scheduled in advance (the time of the downlink data of one subframe is 1 ms, which is longer than the round-trip delay of data transmission on the CPRI interface, namely, 100 us), while only downlink data of 2 OFDM symbols needs to be delivered in advance on the CPRI interface. Certainly, according to actual needs, in another embodiment, it is also possible to schedule downlink data of 2 subframes in advance and deliver downlink data of 3 OFDM symbols in advance. The embodiment of the present disclosure imposes no special limitation.

In an embodiment, because the REC simultaneously transmits two types of downlink data (the remaining part of the downlink data of the current downlink period and a part of the downlink data of the next downlink period) through the CPRI interface, the REC also transmits demarcation point information of the two types of downlink data.

Further, in an embodiment, the round-trip delay of data transmission on the CPRI interface and the round-trip delay of data transmission on the air interface generally do not match, and two cases are discussed as follows:

1. if the round-trip delay of data transmission on the CPRI interface≤the round-trip delay of data transmission on the air interface, the guard period (GP) of the air interface may be used for transmitting the downlink data to be delivered in advance; and 2. if the round-trip delay of data transmission on the CPRI interface>the round-trip delay of data transmission on the air interface, to ensure continuous transmission of air interface frames, the digital baseband signals transmitted on the CPRI interface need to be compressed.

Figure 21:
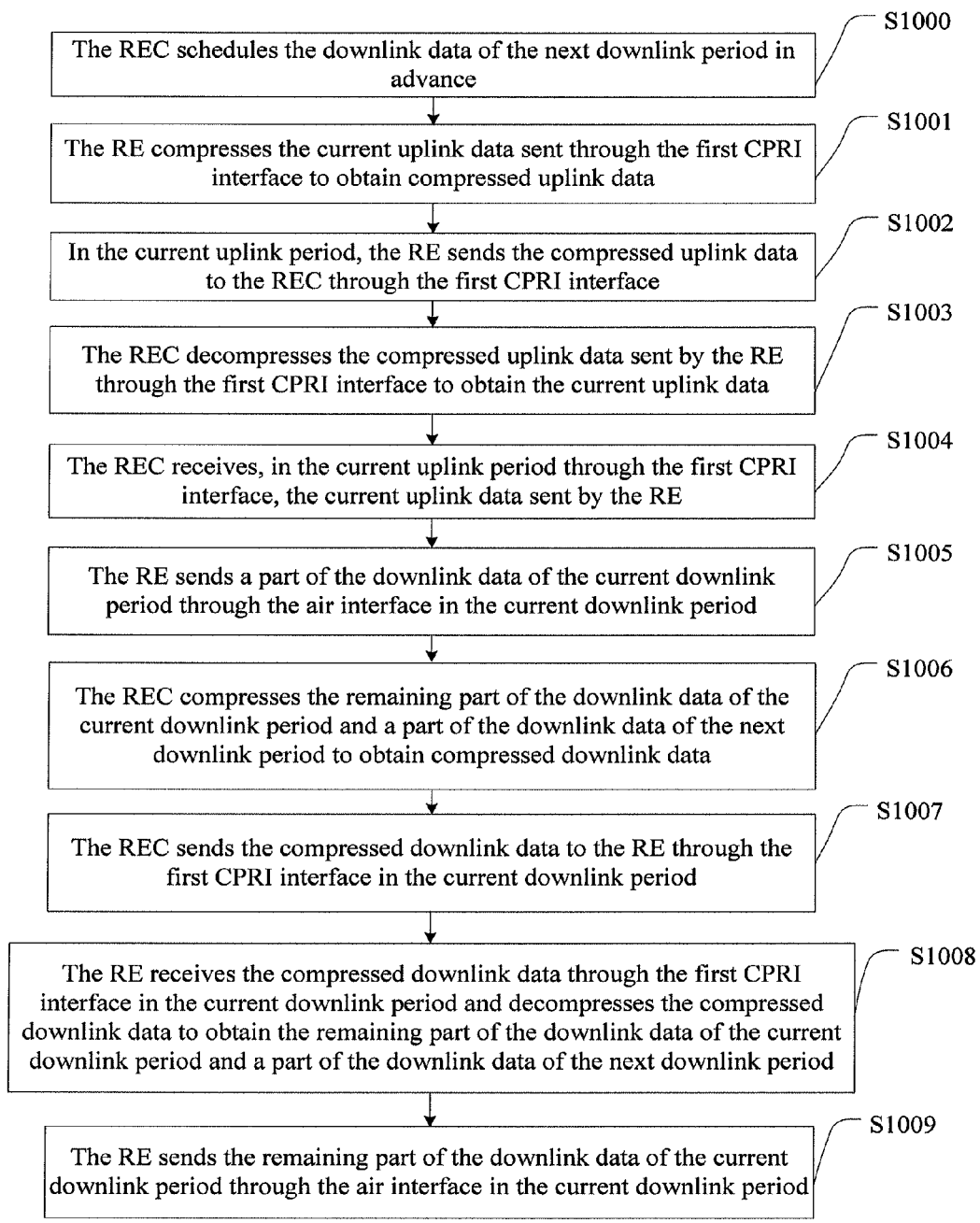
FIG. 21 is a flowchart of a data transmission method according to an embodiment of the present disclosure.

In an embodiment, the compression of the digital baseband signals may be performed for both the uplink and downlink data. Certainly, in an embodiment, the compression of the digital baseband signals may also be performed for the downlink or uplink data only. For the second case, an embodiment of the present disclosure provides a data transmission method. In this embodiment, data is transmitted between an RE and an REC through one CPRI interface (the first CPRI interface). As shown in FIG. 21, the method includes the following steps:

S1001. The RE compresses the current uplink data sent through a first CPRI interface to obtain compressed uplink data.

S1002. In the current uplink period, the RE sends the compressed uplink data to the REC through the first CPRI interface.

S1003. The REC decompresses the compressed uplink data sent by the RE through the first CPRI interface to obtain the current uplink data.

S1004. The REC receives, in the current uplink period through the first CPRI interface, the current uplink data sent by the RE.

S1005. The RE sends a part of the downlink data of the current downlink period through the air interface in the current downlink period, where the part of the downlink data of the current downlink period is sent by the REC to the RE in advance through the first CPRI interface in the previous downlink period.

S1006. The REC compresses the remaining part of the downlink data of the current downlink period and a part of the downlink data of the next downlink period to obtain compressed downlink data.

S1007. The REC sends the compressed downlink data to the RE through the first CPRI interface in the current downlink period.

In an embodiment, the transmission time of the part of the downlink data of the next downlink period on the air interface is longer than or equal to the round-trip delay of data transmission on the first CPRI interface and is shorter than or equal to the transmission time of all downlink data of the next downlink period on the air interface.

S1008. The RE receives the compressed downlink data through the first CPRI interface in the current downlink period and decompresses the compressed downlink data to obtain the remaining part of the downlink data of the current downlink period and a part of the downlink data of the next downlink period.

In an embodiment, the part of the downlink data of the next downlink period is sent by the RE through the air interface in the next downlink period.

S1009. The RE sends the remaining part of the downlink data of the current downlink period through the air interface in the current downlink period.

As shown by the dashed-line box in FIG. 21, in an embodiment, the method also includes the following step:

S1000. The REC schedules the downlink data of the next downlink period in advance, where the transmission time of the downlink data of the next downlink period on the air interface that is scheduled in advance is longer than or equal to the transmission time of a part of the downlink data of the next downlink period on the air interface, and is shorter than or equal to the transmission time of all downlink data of the next downlink period on the air interface.

In the foregoing technical solutions of the embodiments of the present disclosure, the original padding bits are used for transmitting useful information, and one CPRI interface supports uplink and downlink data transmission, which may effectively improve the transmission bandwidth utilization of the CPRI interface and significantly save optical fiber overheads; and the REC delivers a part or all of the downlink data of the next downlink period in advance, so that there is no additional delay on the air interface and that the utilization of spectrum resources on the air interface is effectively improved.

Figure 13:
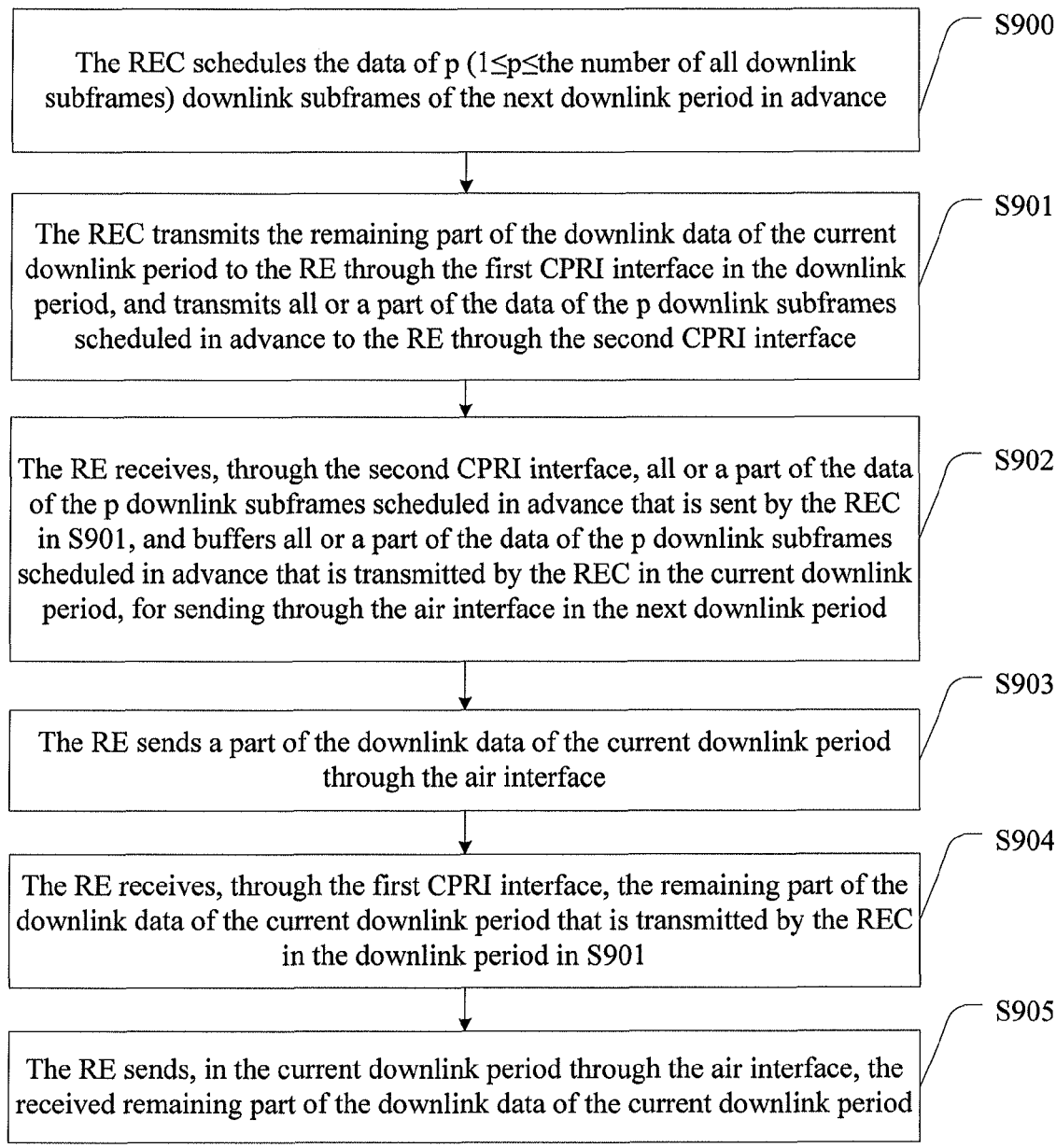
FIG. 13 is a flowchart of a data transmission method according to an embodiment of the present disclosure.

As shown in FIG. 13, an embodiment of the present disclosure provides a data transmission method which may be applied in a TDD system. In this method, an REC and an RE simultaneously transmit the uplink and downlink data of the current downlink period through one CPRI interface, and the REC delivers a part of the downlink data of the next downlink period in advance through another independent CPRI interface. This method includes the following steps:

S900. The REC schedules the data of p ($1 \leq p \leq$ the number of all downlink subframes) downlink subframes of the next downlink period in advance.

It should be noted that the process of scheduling data in advance by the REC may be performed in the current downlink period or in one or more previous uplink periods. This embodiment of the present disclosure imposes no special limitation.

S901. The REC transmits the remaining part of the downlink data of the current downlink period to the RE through a first CPRI interface in the current downlink period, and transmits all or a part of the data of the p downlink subframes scheduled in advance to the RE through a second CPRI interface in the current uplink period.

In an embodiment, the REC may transmit, in the current downlink period, all data in the p downlink subframes scheduled in advance.

In an embodiment, the REC may also transmit, in the current downlink period, a part of the data of the p subframes scheduled in advance; the part of data may be data of m ($1 \leq m \leq p$) downlink subframes or downlink data of k OFDM symbols (it should be noted that the transmission time of one subframe on the air interface is the time of 14 OFDM symbols, so $k \leq 14p$).

For example, in an embodiment, the downlink data to be scheduled in advance and the downlink data to be delivered in advance may be determined according to the round-trip delay of data transmission on the first CPRI interface. The downlink data to be scheduled in advance may be data of an integral number of downlink subframes, where the transmission time of the data of the integral number of downlink subframes on the air interface is longer than or equal to the round-trip delay of data transmission on the CPRI interface; in an embodiment, the downlink data to be delivered in advance may be downlink data of an integral number of OFDM symbols, where the transmission time of the integral number of OFDM symbols on the air interface is longer than or equal to the round-trip delay of data transmission on the CPRI interface. It is easy to understand that the transmission time, on the air interface, of the data delivered in advance is shorter than or equal to the transmission time, on the air interface, of the data scheduled in advance.

S902. The RE receives, in the current uplink period through the second CPRI interface, all or a part of the data of the p downlink subframes scheduled in advance that is sent by the REC in S901, and buffers all or a part of the data of the p downlink subframes scheduled in advance that is transmitted by the REC in the current downlink period, so that the data is sent through the air interface in the next downlink period.

S903. The RE sends a part of the downlink data of the current downlink period through the air interface in the current downlink period, where the part of the downlink data of the current downlink period is sent by the REC to the RE in advance in the previous uplink period.

S904. The RE receives, in the current downlink period through the first CPRI interface, the remaining part of the downlink data of the current downlink period that is transmitted by the REC in the downlink period in S901.

S905. The RE sends, in the current downlink period through the air interface, the received remaining part of the downlink data of the current downlink period.

Figure 14:
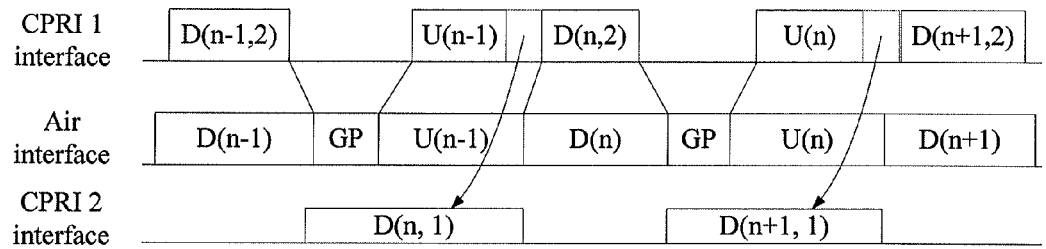
FIG. 14 is a schematic sequence chart of data transmission between a CPRI interface and an air interface according to an embodiment of the present disclosure.

FIG. 14 is a schematic sequence chart of data transmission between a CPRI interface and an air interface according to an embodiment of the present disclosure. As shown in FIG. 14, immediately after the sending of D(n−1, 2) is completed (it should be noted that D(n−1, 2) herein is the remaining part of data of the (n−1)$^{th}$ downlink period and is sent to the RE through a first CPRI interface, that is, the CPRI1 interface), the downlink data D(n, 1) of the n$^{th}$ downlink period that is to be delivered in advance is transmitted on the CPRI2 interface (namely, a second CPRI interface) of an REC and arrives at an RE before the n$^{th}$ downlink period of the air interface.

From FIG. 14, it is easy to understand that the REC may send D(n, 1) through the second CPRI interface in the current uplink period (this is the case in FIG. 14). In this case, D(n, 1) may be sent to the RE before the next downlink period (namely, the n$^{th}$ downlink period, assuming that the current downlink period is the (n−1)$^{th}$ downlink period) arrives, as shown by the arrows in the drawing.

Similarly, after the remaining part of data D(n, 2) of the n$^{th}$ downlink period is sent to the RE by the CPRI1 interface, the downlink data D(n+1, 1) of the (n+1)$^{th}$ downlink period that is to be delivered in advance is sent to the RE by the CPRI2 interface and arrives at the RE before the (n+1)$^{th}$ downlink period.

From FIG. 14, it is easy to understand that in another embodiment, the REC may also send D(n, 1) through the second CPRI interface in the current downlink period (because in FIG. 14, the timeslot of the (n−1)$^{th}$ downlink period precedes the timeslot of the (n−1)$^{th}$ uplink period), so that D(n, 1) may also arrive at the RE before the (n+1)$^{th}$ downlink period.

In one aspect, the amount of downlink data to be delivered in advance is very small, for example, as described in the foregoing embodiment, only downlink data of 2 OFDM symbols needs to be delivered in advance for a 10 km optical fiber; and in another aspect, the transmission time may be very long, for example, if uplink/downlink subframe ratios are the same and there is only one uplink/downlink switching point, an uplink period is about 5 ms. Therefore, data of 2 OFDM symbols may be transmitted in 5 ms, and the transmission rate on the second CPRI interface is very low, so that the second CPRI interface may be used by multiple antennas based on time division multiplexing (the time division multiplexing of the second CPRI interface by multiple antennas is a conventional technology and may be implemented with reference to the CPRI specification v4.2, and therefore, is not repeatedly described herein), therefore effectively reducing overheads in optical fiber deployment.

Taking digital baseband transmission in which one REC supports three REs, each RE has four antennas and one optical fiber supports one antenna as an example, conventionally, one antenna uses two optical fibers to transmit uplink and downlink data, so 24 optical fibers need to be deployed for one REC, but by using the solution of the second embodiment, only 12+1=13 optical fibers need to be deployed, therefore increasing the utilization of transmission bandwidth of the CPRI interface by 46%.

In the foregoing technical solutions of the embodiments of the present disclosure, the original padding bits are used for transmitting useful information, and one CPRI interface supports uplink and downlink data transmission, which may effectively improve the transmission bandwidth utilization of the CPRI interface and significantly save optical fiber overheads; and the REC delivers a part or all of the downlink data of the next downlink period in advance, so that there is no additional delay on the air interface and that the utilization of spectrum resources on the air interface is effectively improved.

Figure 15:
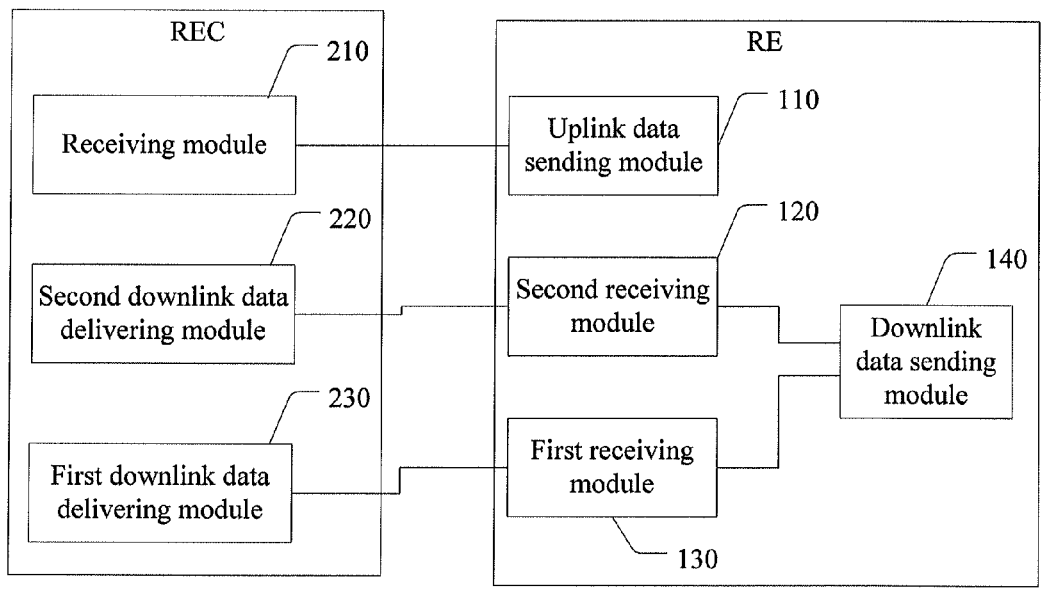
FIG. 15 is a structural diagram of a base station according to an embodiment of the present disclosure.

Corresponding to the foregoing method embodiments, an embodiment of the present disclosure provides a base station. As shown in FIG. 15, in the base station, an RE includes an uplink data sending module 110, a second receiving module 120, a first receiving module 130, and a downlink data sending module 140, and an REC includes a receiving module 210, a second downlink data delivering module 220, and a first downlink data delivering module 230.

The uplink data sending module 110 is configured to send the current uplink data to the REC in the current uplink period.

The receiving module 210 is configured to receive the current uplink data in the current uplink period.

The second downlink data delivering module 220 is configured to send the remaining part of the downlink data of the current downlink period to the RE in the current downlink period.

The first downlink data delivering module 230 is configured to send a part of the downlink data of the next downlink period to the RE before the next downlink period arrives.

In an embodiment, the transmission time of the part of the downlink data of the next downlink period on the air interface is longer than or equal to the round-trip delay of data transmission on the CPRI interface between the REC and the RE and is shorter than or equal to the transmission time of all downlink data of the next downlink period on the air interface.

The second receiving module 120 is configured to receive the remaining part of the downlink data of the current downlink period in the current downlink period.

The first receiving module 130 is configured to receive the part of the downlink data of the next downlink period.

The downlink data sending module 140 is configured to send the part of the downlink data of the current downlink period and the remaining part of the downlink data of the current downlink period through the air interface in the current downlink period, where the part of the downlink data of the current downlink period is sent to the RE by the first downlink data delivering module 230 of the REC before the current downlink period arrives.

In an embodiment, the part of the downlink data of the next downlink period is sent by the downlink data sending module 140 of the RE through the air interface in the next downlink period.

In the foregoing technical solutions of the embodiments of the present disclosure, the original padding bits are used for transmitting useful information, and one CPRI interface supports uplink and downlink data transmission, which may effectively improve the transmission bandwidth utilization of the CPRI interface and significantly save optical fiber overheads; and the REC delivers a part or all of the downlink data of the next downlink period in advance, so that there is no additional delay on the air interface and that the utilization of spectrum resources on the air interface is effectively improved.

Figure 16:
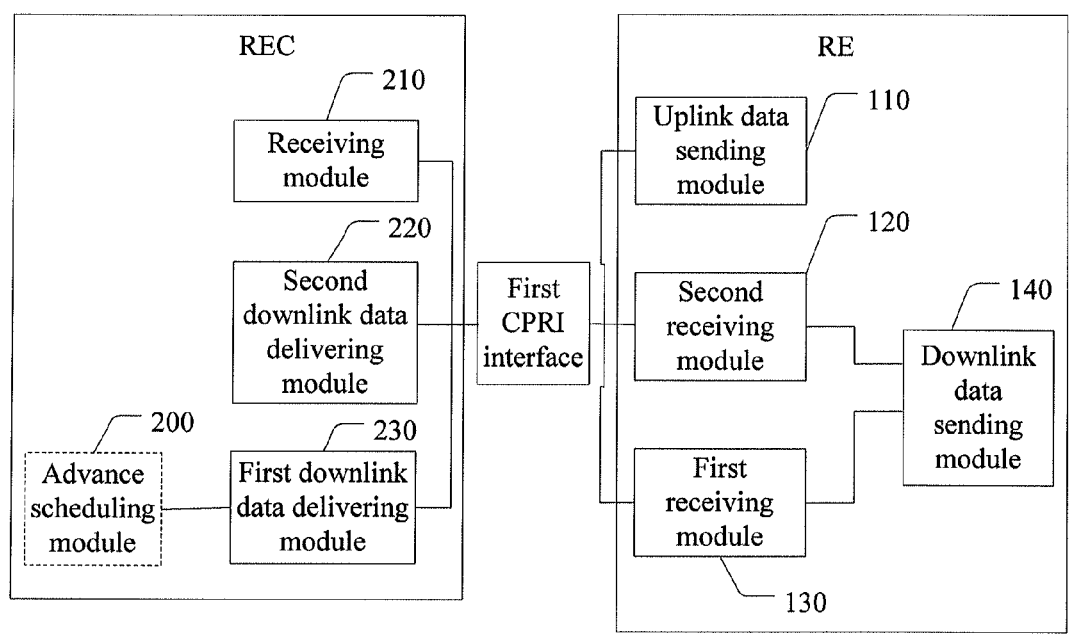
FIG. 16 is a structural diagram of a base station according to an embodiment of the present disclosure.

Corresponding to the foregoing method embodiments, an embodiment of the present disclosure provides a base station. As shown in FIG. 16, the base station includes: an REC and an RE; and data is transmitted between the REC and the RE through one CPRI interface.

The REC includes:

a receiving module 210, configured to receive, in the current uplink period through a first CPRI interface, the current uplink data sent by the RE;

a second downlink data delivering module 220, configured to transmit, in the current downlink period, the remaining part of the downlink data of the current downlink period to the first CPRI interface, and send the remaining part of the downlink data of the current downlink period through the first CPRI interface; and a first downlink data delivering module 230, configured to transmit, in the current downlink period, a part of the downlink data of the next downlink period to the first CPRI interface, and send a part of the downlink data of the next downlink period through the first CPRI interface.

In an embodiment, the transmission time of the part of the downlink data of the next downlink period on an air interface is longer than or equal to the round-trip delay of data transmission on the first CPRI interface and is shorter than or equal to the transmission time of all downlink data of the next downlink period on the air interface.

In an embodiment, as shown by the dashed-line box in FIG. 16, the REC also includes:

an advance scheduling module 200, configured to schedule the downlink data of the next downlink period in advance, where the transmission time of the downlink data of the next downlink period on the air interface that is scheduled in advance is longer than or equal to the transmission time of the part of the downlink data of the next downlink period on the air interface, and is shorter than or equal to the transmission time of all downlink data of the next downlink period on the air interface.

Alternatively, in an embodiment, the advance scheduling module 200 may be integrated with the first downlink data delivering module 230.

The RE includes:

an uplink data sending module 110, configured to send the current uplink data to the REC through the first CPRI interface in the current uplink period;

a second receiving module 120, configured to receive, in the current downlink period through the first CPRI interface, the remaining part of the downlink data of the current downlink period that is sent by the REC;

a first receiving module 130, configured to receive, in the current downlink period through the first CPRI interface, the part of the downlink data of the next downlink period that is sent by the REC; and a downlink data sending module 140, configured to send a part of the downlink data of the current downlink period and the remaining part of the downlink data of the current downlink period through the air interface in the current downlink period, where the part of the downlink data of the current downlink period is sent to the RE in advance by the first downlink data delivering module 230 of the REC in the previous downlink period.

In an embodiment, the part of the downlink data of the next downlink period is sent by the downlink data sending module 140 of the RE through the air interface in the next downlink period.

Further, in an embodiment, the round-trip delay of data transmission on the first CPRI interface and the round-trip delay of data transmission on the air interface generally do not match, and two cases are discussed as follows:

1. if the round-trip delay of data transmission on the first CPRI interface<the round-trip delay of data transmission on the air interface, the guard period (GP) of the air interface may be used for transmitting the downlink data to be delivered in advance; and 2. if the round-trip delay of data transmission on the first CPRI interface>the round-trip delay of data transmission on the air interface, to ensure continuous transmission of air interface frames, the data transmitted on the first CPRI interface needs to be compressed.

Figure 17:
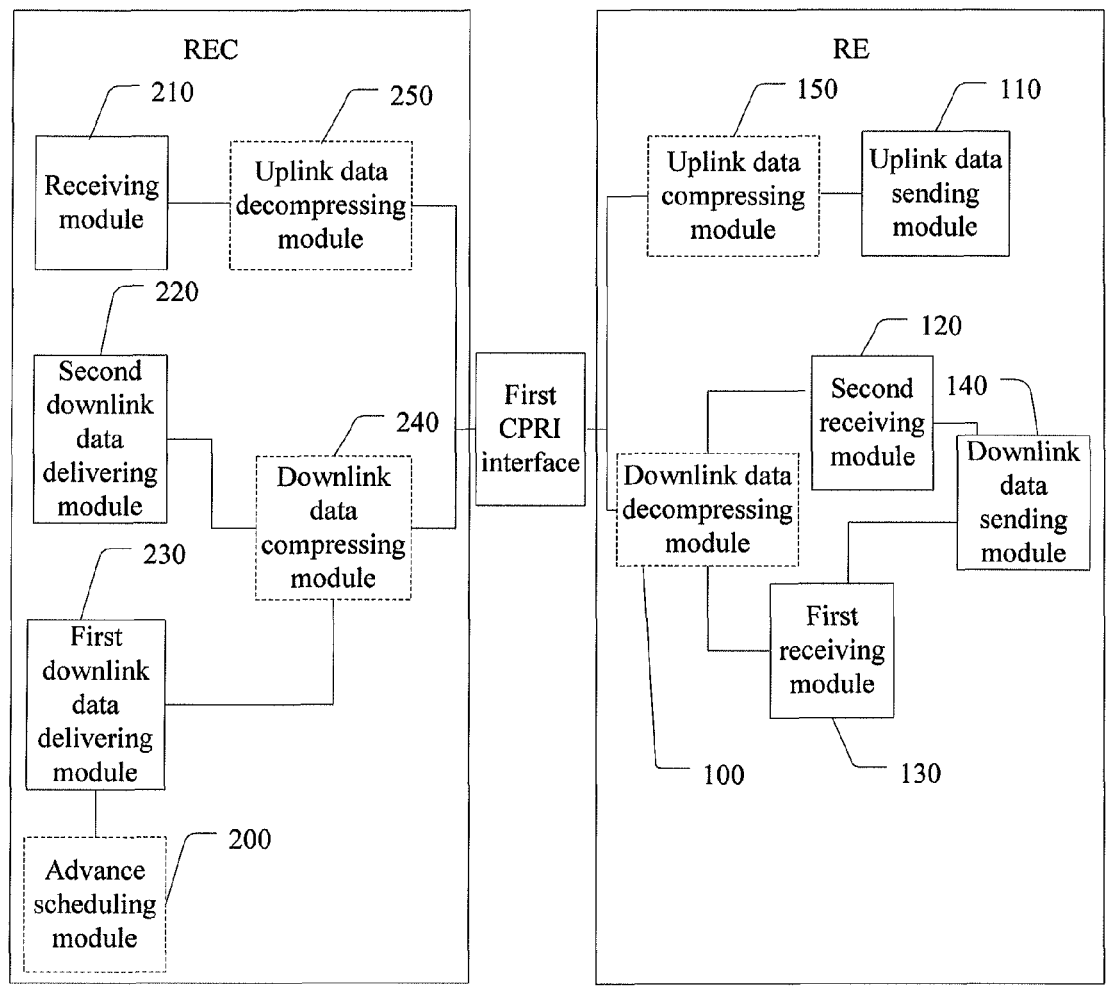
FIG. 17 is a structural diagram of a base station according to an embodiment of the present disclosure.

As shown in FIG. 17, for the case 2, in an embodiment, the REC may also include:

a downlink data compressing module 240, configured to compress the remaining part of the downlink data of the current downlink period and the part of the downlink data of the next downlink period when the round-trip delay of data transmission on the first CPRI interface is longer than the round-trip delay of data transmission on the air interface, so as to obtain compressed downlink data, so that the compressed downlink data is sent to the RE through the first CPRI interface.

Accordingly, the RE may also include:

a downlink data decompressing module 100, configured to decompress the compressed downlink data to obtain the remaining part of the downlink data of the current downlink period and the part of the downlink data of the next downlink period.

Similarly, in an embodiment, the RE may also include:

an uplink data compressing module 150, configured to compress, when the round-trip delay of data transmission on the first CPRI interface is longer than the round-trip delay of data transmission on the air interface, the uplink data sent through the first CPRI interface to obtain compressed uplink data, where the compressed uplink data is sent to the REC through the first CPRI interface.

Accordingly, the REC may also include:

an uplink data decompressing module 250, configured to decompress, before the receiving module 210 receives the data, the compressed uplink data sent through the first CPRI interface.

Figure 18:
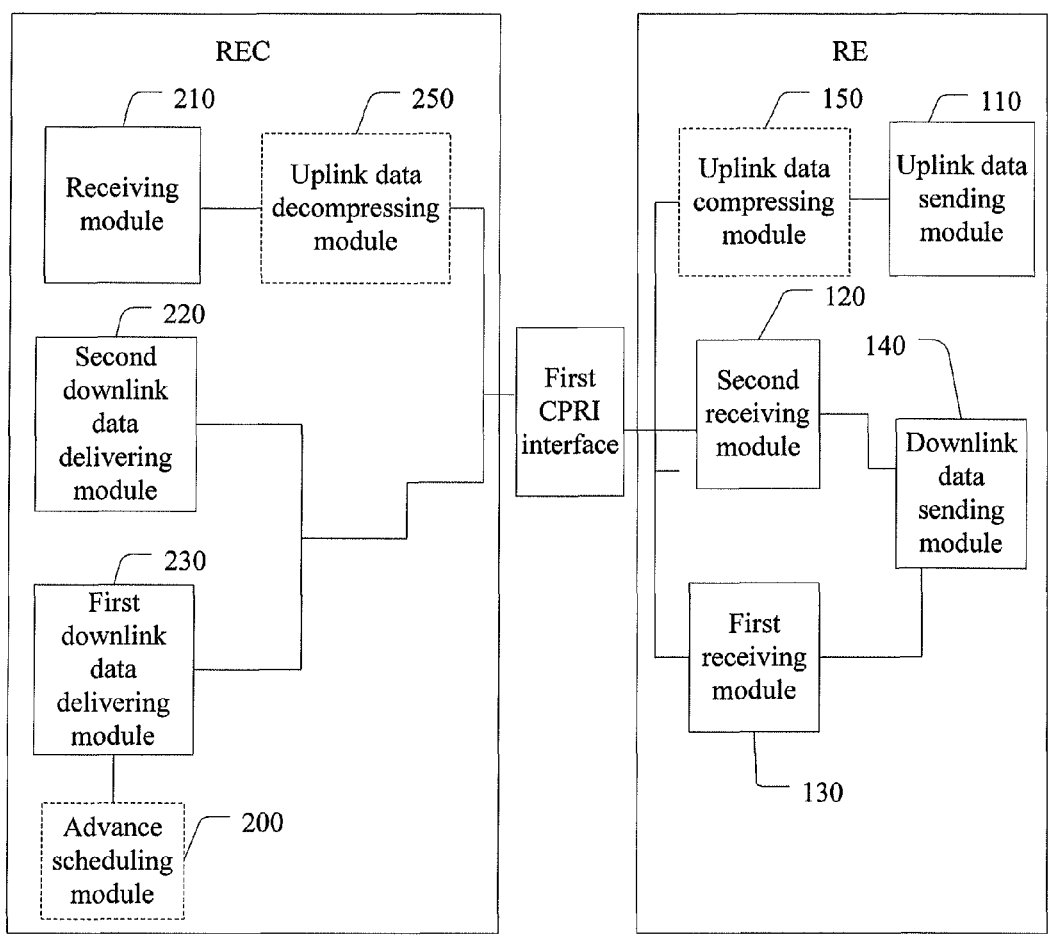
FIG. 18 is a structural diagram of a base station according to an embodiment of the present disclosure.
Figure 19:
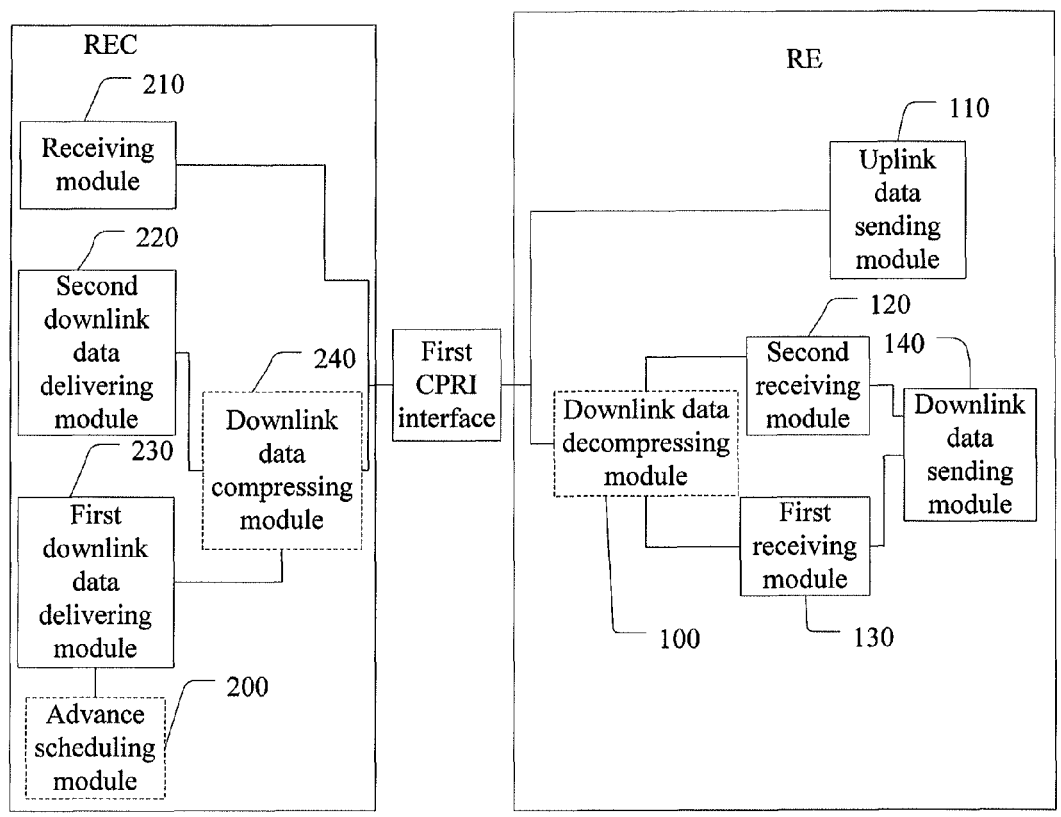
FIG. 19 is a structural diagram of a base station according to an embodiment of the present disclosure.
Figure 20:
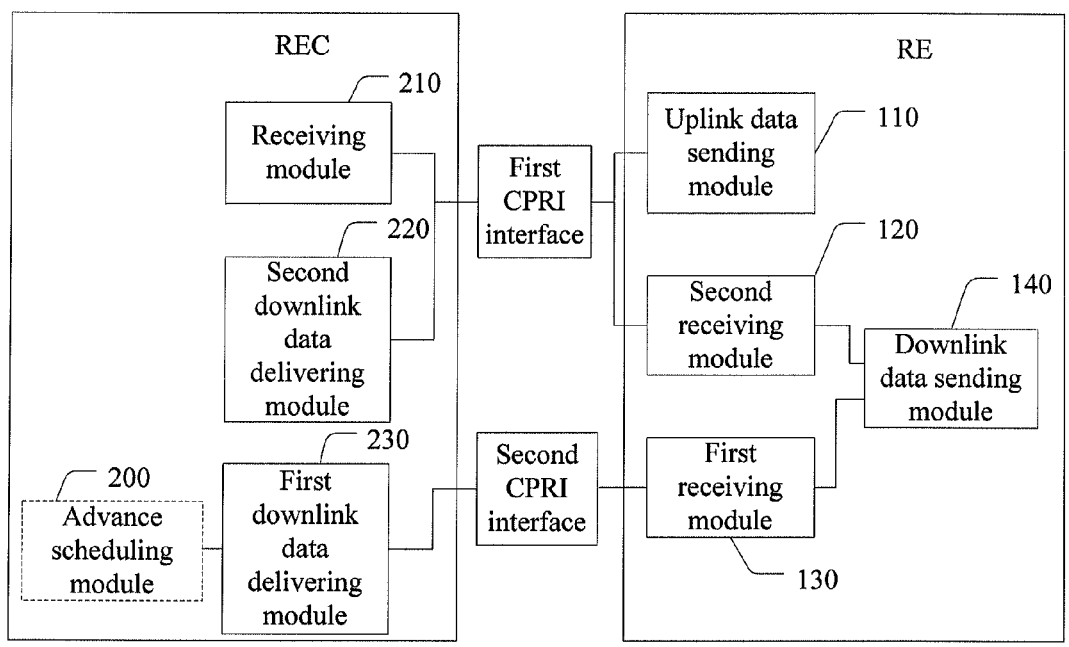
FIG. 20 is a structural diagram of a base station according to an embodiment of the present disclosure.

It should be noted that in the embodiment as shown in FIG. 17, the base station includes an uplink data compressing module 150, an uplink data decompressing module 250, a downlink data compressing module 240, and a downlink data decompressing module 100. In an embodiment, as shown in FIG. 18, the base station may include an uplink data compressing module 150 and an uplink data decompressing module 250 only; in an embodiment, as shown in FIG. 19, the base station may also include a downlink data compressing module 240 and a downlink data decompressing module 100 only. The embodiments of the present disclosure impose no special limitation.

In the foregoing technical solutions of the embodiments of the present disclosure, the original padding bits are used for transmitting useful information, and one CPRI interface supports uplink and downlink data transmission, which may effectively improve the transmission bandwidth utilization of the CPRI interface and significantly save optical fiber overheads; and the REC delivers a part or all of the downlink data of the next downlink period in advance, so that there is no additional delay on the air interface and that the utilization of spectrum resources on the air interface is effectively improved.

Corresponding to the foregoing method embodiments, an embodiment of the present disclosure provides a base station. As shown in FIG. 17, the base station includes: an REC and an RE; and data is transmitted between the REC and the RE through two CPRI interfaces.

The REC includes:

a receiving module 210, configured to receive, in the current uplink period through a first CPRI interface, the current uplink data sent by the RE;

a second downlink data delivering module 220, configured to send, in the current downlink period through the first CPRI interface, the remaining part of the downlink data of the current downlink period; and a first downlink data delivering module 230, configured to send, in the current downlink period or the current uplink period through a second CPRI interface, a part of the downlink data of the next downlink period.

In an embodiment, the transmission time of the part of the downlink data of the next downlink period on an air interface is longer than or equal to the round-trip delay of data transmission on the first CPRI interface and is shorter than or equal to the transmission time of all downlink data of the next downlink period on the air interface.

In an embodiment, as shown by the dashed-line box in FIG. 17, the REC also includes:

an advance scheduling module 200, configured to schedule the downlink data of the next downlink period in advance, where the transmission time of the downlink data of the next downlink period on the air interface that is scheduled in advance is longer than or equal to the transmission time of the part of the downlink data of the next downlink period on the air interface, and is shorter than or equal to the transmission time of all downlink data of the next downlink period on the air interface.

Alternatively, in an embodiment, the advance scheduling module 200 may be integrated with the first downlink data delivering module 230.

The RE includes:

an uplink data sending module 110, configured to send the current uplink data to the REC through the first CPRI interface in the current uplink period;

a second receiving module 120, configured to receive, in the current downlink period through the first CPRI interface, the remaining part of the downlink data of the current downlink period that is sent by the REC;

a first receiving module 130, configured to receive, in the current downlink period or the current uplink period through the second CPRI interface, the part of the downlink data of the next downlink period that is sent by the REC; and a downlink data sending module 140, configured to send a part of the downlink data of the current downlink period and the remaining part of the downlink data of the current downlink period through the air interface in the current downlink period, where the part of the downlink data of the current downlink period is sent to the RE in advance by the first downlink data delivering module 230 of the REC through the second CPRI interface in the previous downlink period or previous uplink period.

In an embodiment, the part of the downlink data of the next downlink period is sent by the downlink data sending module 140 of the RE through the air interface in the next downlink period.

In the foregoing technical solutions of the embodiments of the present disclosure, the original padding bits are used for transmitting useful information, and one CPRI interface supports uplink and downlink data transmission, which may effectively improve the transmission bandwidth utilization of the CPRI interface and significantly save optical fiber overheads; and the REC delivers a part or all of the downlink data of the next downlink period in advance, so that there is no additional delay on the air interface and that the utilization of spectrum resources on the air interface is effectively improved.

Figure 22:
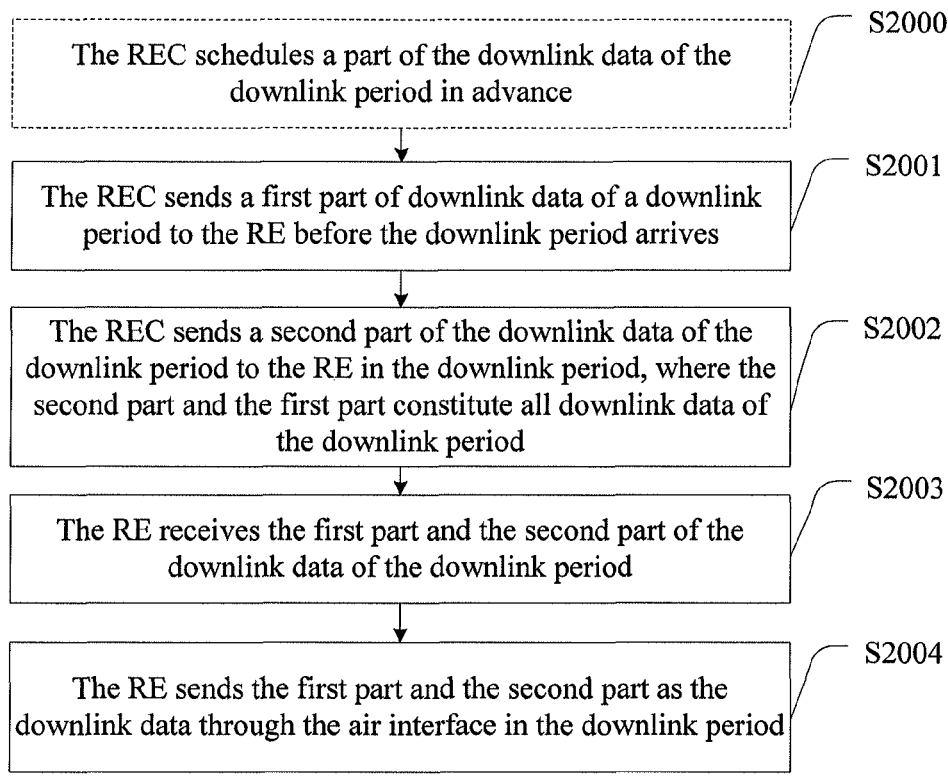
FIG. 22 is a flowchart of a data transmission method according to an embodiment of the present disclosure.

According to the description of the foregoing method embodiments, in an embodiment, the methods provided by the embodiments of the present disclosure may be summarized to be main steps in an embodiment as shown in FIG. 22. As shown in FIG. 22, the embodiment of the present disclosure provides a data transmission method, including the following steps:

S2001. An REC sends a first part of downlink data of a downlink period to an RE before the downlink period arrives.

Alternatively, the transmission time of the first part of the downlink data of the downlink period on an air interface is longer than or equal to the round-trip delay of data transmission on a first CPRI interface and is shorter than or equal to the transmission time of all downlink data of the downlink period on the air interface.

In an embodiment, the REC sends the first part of the downlink data of the downlink period to the RE through the first CPRI interface in the previous downlink period.

In this case, when the round-trip delay of data transmission on the first CPRI interface is longer than the round-trip delay of data transmission on the air interface, before the REC sends the first part of the downlink data of the downlink period to the RE through the first CPRI interface in the previous downlink period, the method may also include:

compressing, by the REC, the first part of the downlink data of the downlink period to obtain a first part of compressed downlink data; in this case, the REC sends the first part of the compressed downlink data to the RE through the first CPRI interface in the previous downlink period.

Accordingly, the RE decompresses the first part of the compressed downlink data to obtain the first part of the downlink data of the downlink period.

In an embodiment, the REC sends the first part of the downlink data of the downlink period to the RE through a second CPRI interface in the previous downlink period or previous uplink period.

S2002. The REC sends a second part of the downlink data of the downlink period to the RE in the downlink period, where the second part and the first part constitute all downlink data of the downlink period.

For example, in an embodiment, the REC sends the second part of the downlink data of the downlink period to the RE through the first CPRI interface, and the REC also receives, through the first CPRI interface, the uplink data sent by the RE.

In an embodiment, when the round-trip delay of data transmission on the first CPRI interface is longer than the round-trip delay of data transmission on the air interface, before the REC sends the second part of the downlink data of the downlink period to the RE in the downlink period, the method also includes:

compressing, by the REC, the second part of the downlink data of the downlink period to obtain a second part of compressed downlink data; in this case, the REC sends the second part of the compressed downlink data to the RE through the first CPRI interface in the downlink period.

Accordingly, the RE decompresses the second part of the compressed downlink data to obtain the second part of the downlink data of the downlink period.

S2003. The RE receives the first part and the second part of the downlink data of the downlink period.

S2004. The RE sends the first part and the second part as the downlink data through the air interface in the downlink period.

The part of the downlink data of the current downlink period as mentioned in the foregoing embodiments may be understood to be the first part of the downlink data of the downlink period.

The remaining part of the downlink data of the current downlink period as mentioned in the foregoing embodiments may be understood to be the second part of the downlink data of the downlink period.

Certainly, as described in the foregoing embodiments, the method may also include the following step:

S2000. The REC schedules a part of the downlink data of the downlink period in advance, where the transmission time of the part of the downlink data of the downlink period on the air interface that is scheduled in advance is longer than or equal to the transmission time of the first part of the downlink data of the downlink period on the air interface, and is shorter than or equal to the transmission time of all downlink data of the downlink period on the air interface.

In the foregoing technical solutions of the embodiments of the present disclosure, the original padding bits are used for transmitting useful information, and one CPRI interface supports uplink and downlink data transmission, which may effectively improve the transmission bandwidth utilization of the CPRI interface and significantly save optical fiber overheads; and the REC delivers a part or all of the downlink data of the next downlink period in advance, so that there is no additional delay on the air interface and that the utilization of spectrum resources on the air interface is effectively improved.

Figure 23:
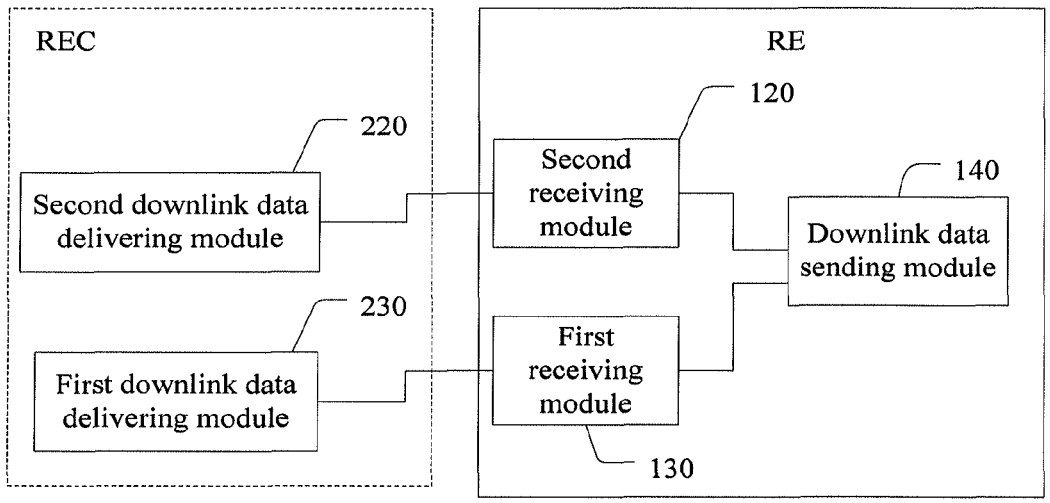
FIG. 23 is a structural diagram of a base station according to an embodiment of the present disclosure.

Accordingly, according to the description of the foregoing apparatus embodiments, in an embodiment, the base station provided by the embodiments of the present disclosure may be summarized to have the main structure as shown in FIG. 23. As shown in FIG. 23, an embodiment of the present disclosure provides a base station which is applied in a time division duplex TDD system. The base station includes a radio equipment RE and a radio equipment controller REC, where the RE includes a first receiving module 130, a second receiving module 120, and a downlink data sending module 140, and the REC includes a first downlink data delivering module 230 and a second downlink data delivering module 220.

The first downlink data delivering module 230 is configured to send a first part of downlink data of a downlink period to a radio equipment RE before the downlink period arrives.

Alternatively, the transmission time of the first part of the downlink data of the next downlink period on an air interface is longer than or equal to the round-trip delay of data transmission on a first CPRI interface and is shorter than or equal to the transmission time of all downlink data of the downlink period on the air interface.

In an embodiment, the first downlink data delivering module 230 sends the first part of the downlink data of the downlink period to the RE through the first CPRI interface in the previous downlink period.

In an embodiment, the first downlink data delivering module 230 is configured to send the first part of the downlink data of the downlink period to the RE through a second CPRI interface in the previous downlink period or previous uplink period.

The second downlink data delivering module 220 is configured to send a second part of the downlink data of the downlink period to the RE in the downlink period, where the second part and the first part constitute all downlink data of the downlink period.

In an embodiment, the second downlink data delivering module 220 sends the second part of the downlink data of the downlink period to the RE through the first CPRI interface; the REC also includes a receiving module configured to receive, through the first CPRI interface, the uplink data sent by the RE.

The first receiving module 130 is configured to receive the first part of the downlink data of the downlink period.

The second receiving module 120 is configured to receive the second part of the downlink data of the downlink period.

The downlink data sending module 140 is configured to send the first part and the second part as the downlink data through the air interface in the downlink period.

The part of the downlink data of the current downlink period as mentioned in the foregoing embodiments may be understood to be the first part of the downlink data of the downlink period.

The remaining part of the downlink data of the current downlink period as mentioned in the foregoing embodiments may be understood to be the second part of the downlink data of the downlink period.

Certainly, as mentioned in the foregoing embodiments, the base station may also include (not shown in FIG. 23, the reference numbers of various modules in the foregoing embodiments are used to indicate the names of various modules):

The REC also includes:
a downlink data compressing module 240, configured to compress the first part of the downlink data of the downlink period when the round-trip delay of data transmission on the first CPRI interface is longer than the round-trip delay of data transmission on the air interface, so as to obtain a first part of compressed downlink data.

In this case, the first downlink data delivering module 230 is configured to send the first part of the compressed downlink data to the RE through the first CPRI interface in the previous downlink period.

In this case, the RE also includes:
a downlink data decompressing module 100, configured to decompress the first part of compressed downlink data to obtain the first part of the downlink data of the downlink period.

The downlink data compressing module 240 is also configured to compress the second part of the downlink data of the downlink period to obtain a second part of compressed downlink data.

In this case, the first downlink data delivering module 230 is specifically configured to send the second part of the compressed downlink data to the RE through the first CPRI interface in the downlink period.

In this case, the downlink data decompressing module 100 is also configured to decompress the second part of the compressed downlink data to obtain the second part of the downlink data of the downlink period.

The REC also includes:
an advance scheduling module 200, configured to schedule a part of the downlink data of the downlink period in advance, where the transmission time of the part of the downlink data of the downlink period on the air interface that is scheduled in advance is longer than or equal to the transmission time of the first part of the downlink data of the downlink period on the air interface, and is shorter than or equal to the transmission time of all downlink data of the downlink period on the air interface.

The specific functions of various modules have been described in detail in the foregoing apparatus embodiments and are not repeatedly described herein.

In the foregoing technical solutions of the embodiments of the present disclosure, the original padding bits are used for transmitting useful information, and one CPRI interface supports uplink and downlink data transmission, which may effectively improve the transmission bandwidth utilization of the CPRI interface and significantly save optical fiber overheads; and the REC delivers a part or all of the downlink data of the next downlink period in advance, so that there is no additional delay on the air interface and that the utilization of spectrum resources on the air interface is effectively improved.

It should be noted that the operation of scheduling in advance in the foregoing method embodiments and the advance scheduling module in the foregoing apparatus embodiments are not mandatory, and when data needs to be delivered in advance, the data may be delivered in advance directly without being scheduled in advance. The embodiments of the present disclosure impose no special limitation.

Persons of ordinary skill in the art may understand that all or a part of processes in the methods of the above embodiments may be implemented by relevant hardware instructed by a computer program. The computer program may be stored in a computer readable storage medium and when executed, may include the processes of the embodiments of the above methods. The storage medium may be a magnetic disk, a CD-ROM, a read only memory (Read-Only Memory, ROM), a random access memory (Random Access Memory, RAM), and so on.

Described above are only several embodiments of the present disclosure, and persons skilled in the art may make various modifications or changes to the present disclosure according to the disclosure in the application document without departing from the spirit and scope of the present disclosure.

What is claimed is:

1. A data transmission method implemented in a time division duplex (TDD) system, comprising:
   sending, by a radio equipment controller (REC), a first part of downlink data of a downlink period to a radio equipment (RE) before the downlink period arrives;
   sending, by the REC, a second part of the downlink data of the downlink period to the RE in the downlink period, wherein the second part and the first part constitute all downlink data of the downlink period;
   receiving, by the RE, the first part and the second part of the downlink data of the downlink period; and
   sending, by the RE, the first part and the second part as the downlink data through an air interface in the downlink period;
   wherein the REC sends the second part of the downlink data of the downlink period to the RE through a first Common Public Radio Interface (CPRI) interface, and the REC further receives, through the first CPRI interface, uplink data sent by the RE;
   wherein sending, by the REC, the first part of the downlink data of the downlink period to the RE before the downlink period arrives comprises: sending, by the REC, the first part of the downlink data of the downlink period to the RE through the first CPRI interface in a previous downlink period; and
   wherein a transmission time of the first part of the downlink data of the downlink period on the air interface is longer than or equal to a round-trip delay of data transmission on the first CPRI interface, and is shorter than or equal to a transmission time of all downlink data of the downlink period on the air interface.

2. The data transmission method according to claim 1, wherein when a round-trip delay of data transmission on the first CPRI interface is longer than a round-trip delay of data transmission on the air interface, before the REC sends the first part of the downlink data of the downlink period to the RE through the first CPRI interface in the previous downlink period, the method further comprises:
   compressing, by the REC, the first part of the downlink data of the downlink period to obtain a first part of compressed downlink data.

3. The data transmission method according to claim 2, wherein when the round-trip delay of data transmission on the first CPRI interface is longer than the round-trip delay of data transmission on the air interface, before the REC sends the second part of the downlink data of the downlink period to the RE in the downlink period, the method further comprises:
   compressing, by the REC, the second part of the downlink data of the downlink period to obtain a second part of compressed downlink data.

4. The data transmission method according to claim 1, wherein when a round-trip delay of data transmission on the first CPRI interface is longer than a round-trip delay of data transmission on the air interface, before the REC sends the first part of the downlink data of the downlink period to the RE through the first CPRI interface in the previous downlink period, the method further comprises:
   sending, by the REC, the first part of the downlink data of the downlink period to the RE through the first CPRI interface in the previous downlink period is: sending, by the REC, the first part of the compressed downlink data to the RE through the first CPRI interface in the previous downlink period; and
   decompressing, by the RE, the first part of the compressed downlink data to obtain the first part of the downlink data of the downlink period.

5. The data transmission method according to claim 4, wherein when the round-trip delay of data transmission on the first CPRI interface is longer than the round-trip delay of data transmission on the air interface, before the REC sends the second part of the downlink data of the downlink period to the RE in the downlink period, the method further comprises:
   sending, by the REC, the second part of the downlink data of the downlink period to the RE through the first CPRI interface in the downlink period is: sending, by the REC, the second part of the compressed downlink data to the RE through the first CPRI interface in the downlink period; and
   decompressing, by the RE, the second part of the compressed downlink data to obtain the second part of the downlink data of the downlink period.

6. The data transmission method according to claim 1, wherein multiple antennas of the RE use the second CPRI interface based on time division multiplexing.

7. A base station in a time division duplex (TDD) system, wherein the base station comprises a radio equipment (RE) and a radio equipment controller (REC), and the RE comprises a first receiving module, a second receiving module, and a downlink data sending module, and the REC comprises a first downlink data delivering module and a second downlink data delivering module; wherein:
   the first downlink data delivering module is configured to send a first part of downlink data of a downlink period to the radio equipment RE before the downlink period arrives;
   the second downlink data delivering module is configured to send a second part of the downlink data of the downlink period to the RE in the downlink period, wherein the second part and the first part constitute all downlink data of the downlink period;
   the first receiving module is configured to receive the first part of the downlink data of the downlink period;
   the second receiving module is configured to receive the second part of the downlink data of the downlink period; and
   the downlink data sending module is configured to send the first part and the second part as the downlink data through an air interface in the downlink period;
   wherein the base station further comprises a first Common Public Radio Interface (CPRI) interface, and the second downlink data delivering module sends the second part of the downlink data of the downlink period to the RE through the first CPRI interface; the REC further comprises a receiving module, configured to receive, through the first CPRI interface, uplink data sent by the RE;
   wherein the first downlink data delivering module is configured to send the first part of the downlink data of the downlink period to the RE through the first CPRI interface in a previous downlink period; and
   wherein a transmission time of the first part of the downlink data of a next downlink period on the air interface is longer than or equal to a round-trip delay of data transmission on the first CPRI interface, and is shorter than or equal to a transmission time of all downlink data of the downlink period on the air interface.

8. The base station according to claim 7, wherein the REC further comprises:
   a downlink data compressing module, configured to compress the first part of the downlink data of the downlink period when a round-trip delay of data transmission on the first CPRI interface is longer than a round-trip delay of data transmission on the air interface, so as to obtain a first part of compressed downlink data;

in this case, the first downlink data delivering module is configured to send the first part of the compressed downlink data to the RE through the first CPRI interface in the previous downlink period.

9. The base station according to claim 8, wherein the downlink data compressing module is further configured to compress the second part of the downlink data of the downlink period to obtain a second part of compressed downlink data;

in this case, the first downlink data delivering module is further configured to send the second part of the compressed downlink data to the RE through the first CPRI interface in the downlink period.

10. The base station according to claim 7, wherein the RE further comprises:

a downlink data decompressing module, configured to decompress the first part of the compressed downlink data to obtain the first part of the downlink data of the downlink period.

11. The base station according to claim 10, wherein the downlink data decompressing module is further configured to decompress the second part of the compressed downlink data to obtain the second part of the downlink data of the downlink period.

* * * * *